(12) United States Patent
Faler et al.

(10) Patent No.: US 10,683,377 B2
(45) Date of Patent: Jun. 16, 2020

(54) CATALYSTS FOR OLEFIN POLYMERIZATION

(71) Applicant: ExxonMobil Chemical Patents Inc., Baytown, TX (US)

(72) Inventors: Catherine A. Faler, Houston, TX (US); Margaret T. Whalley, Houston, TX (US); Crisita Carmen H. Atienza, Houston, TX (US); David A. Cano, Houston, TX (US)

( * ) Notice: Subject to any disclaimer, the term of this patent is extended or adjusted under 35 U.S.C. 154(b) by 0 days.

(21) Appl. No.: 16/457,078

(22) Filed: Jun. 28, 2019

(65) Prior Publication Data

US 2020/0017615 A1    Jan. 16, 2020

Related U.S. Application Data

(60) Provisional application No. 62/698,470, filed on Jul. 16, 2018.

(51) Int. Cl.
| | | |
|---|---|---|
| *C08F 10/02* | (2006.01) | |
| *C08F 210/16* | (2006.01) | |
| *C07F 7/00* | (2006.01) | |

(52) U.S. Cl.
CPC ............ *C08F 210/16* (2013.01); *C07F 7/003* (2013.01); *C08F 2800/20* (2013.01)

(58) Field of Classification Search
CPC ....................................................... C08F 10/02
See application file for complete search history.

(56) References Cited

U.S. PATENT DOCUMENTS

| | | | | |
|---|---|---|---|---|
| 2016/0280722 A1* | 9/2016 | Atienza | ..................... | C07F 7/00 |
| 2019/0040161 A1* | 2/2019 | Atienza | ................... | C08F 10/02 |

FOREIGN PATENT DOCUMENTS

| | | |
|---|---|---|
| CN | 105418672 | 3/2016 |
| DE | 4220353 | 12/1993 |
| WO | 2007/090412 | 8/2007 |
| WO | 2013/101476 | 7/2013 |
| WO | 2013/101478 | 7/2013 |

OTHER PUBLICATIONS

Dornow et al., Archiv der Pharmazie und Berichte der Deutschen Pharmazeutischen Gesellschaft, 1951, vol. 284, pp. 153.
Majima et al., Tetrahedron Letters, 2005, vol. 46, No. 32, pp. 5377.
International Search Report and Written Opinion for international application No. PCT/US2019/039798, dated Nov. 6, 2019.
Sun et al., "Regioselective addition of C(sp3)—H bonds of alkyl pyridines to olefins catalysed by cationic zirconium complexes", Chemical Communications; 2017, vol. 53, pp, 7401-7404.

* cited by examiner

*Primary Examiner* — Catherine S Branch
(74) *Attorney, Agent, or Firm* — Catherine L. Bell

(57) ABSTRACT

The present disclosure provides catalyst compounds having a tridentate ethylene bridged amine bis(phenolate) ligand. Catalysts of the present disclosure preferably provide catalyst activity values of 250 gP/mmolCat/hr or greater and polyolefins, such as polyethylene copolymers, having comonomer content of 8.5 wt % or greater, an Mn of 190,000 g/mol or greater, an Mw of 350,000 g/mol or greater, and a narrow Mw/Mn (such as about 2). Catalysts, catalyst systems, and processes of the present disclosure can provide polymers having a high comonomer content (e.g., 8.5 wt % or greater).

34 Claims, No Drawings

CATALYSTS FOR OLEFIN POLYMERIZATION

PRIORITY CLAIM

This application claims priority to and the benefit of U.S. Ser. No. 62/698,470, filed Jul. 16, 2018 and European patent application number 18190754.4, filed Aug. 24, 2018, both of which are incorporated by reference in their entirety.

FIELD

The present disclosure provides catalyst compounds including tridentate ethylene bridged amine bis(phenolate) transition metal complexes, production, and use thereof.

BACKGROUND

Olefin polymerization catalysts are of great use in industry and polyolefins are widely used commercially because of their robust physical properties. Hence, there is interest in finding new catalyst systems that increase the marketing value of the catalyst and allow the production of polymers having improved properties.

For example, various types of polyethylenes, including high density, low density, and linear low density polyethylenes, are some of the most commercially useful. Suitable polyolefins can be prepared with a catalyst that polymerizes olefin monomers. The ability to precisely modulate polymer architecture and composition is a long standing goal within the field of polymer synthesis which makes catalyst engineering a crucial point. Therefore, there is a need for catalysts having high activity and capable of forming polyolefins, for example, with high molecular weight and high comonomer content. The faculty to precisely control at the atomic levels the structure of a catalyst through manipulation of both the metal and, perhaps more importantly, the supporting ligand(s) is central to the development and utilization of such catalysts in a myriad of applications.

Over the past few years, there has been continuing interest in using bridging ligands in the synthesis of polynuclear complexes of paramagnetic transition metal ions, especially ligands which contain potentially bridging nitrogen donor atoms, called amine bisphenolate ligands. Notwithstanding the apparent simplicity of the ligand framework, amine bisphenolate ligands are valuable tools for generating metal complexes with an adequate balance of thermal stability and reactivity. Although a considerable number of ligands bearing C, N, P, or S donor-based functionalities have been synthesized, Metal IV catalyst complexes containing amine bisphenolate ligands having O-donor fragments have been much less studied. In this context, the ability of amine bisphenolate trianionic ligands for supporting high-oxidation-state metal complexes holding vacant coordination sites, which have been recently exploited for a range of catalytic transformations, is exceptional. There is no literature precedent on group IV catalyst complexes containing a tridentate ethylene bridged amine bis(phenolate) ligand framework for olefin polymerization and the complexes described in the present disclosure are the first examples of this type of catalyst structure.

Low density polyethylene is generally prepared at high pressure using free radical initiators, or in gas phase processes using Ziegler-Natta or vanadium catalysts. Low density polyethylene typically has a density in the range of 0.916 g/cm$^3$ to 0.940 g/cm$^3$. Low density polyethylene produced using free radical initiators is known in the industry as "LDPE". LDPE is also known as "branched" or "heterogeneously branched" polyethylene because of the relatively large number of long chain branches extending from the main polymer backbone. Polyethylene in the same density range, e.g., 0.916 g/cm$^3$ to 0.940 g/cm$^3$, which is linear and does not contain long chain branching, is known as "linear low density polyethylene" ("LLDPE") and can be produced by conventional Ziegler-Natta catalysts or with metallocene catalysts. "Linear" means that the polyethylene has few, if any, long chain branches, referred to as a g'$_{vis}$ value of 0.97 or above, such as 0.98 or above. Polyethylenes having still greater density are the high density polyethylenes ("HDPEs"), e.g., polyethylenes having densities greater than 0.940 g/cm$^3$, and are generally prepared with Ziegler-Natta catalysts or chrome catalysts. Very low density polyethylenes ("VLDPEs") can be produced by a number of different processes yielding polyethylenes having a density less than 0.916 g/cm$^3$, such as 0.890 g/cm$^3$ to 0.915 g/cm$^3$, or 0.900 g/cm$^3$ to 0.915 g/cm$^3$.

Polyolefins, such as polyethylene, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight fraction of the composition with the improved processing properties of a low molecular weight fraction of the composition.

Useful polyolefins, such as polyethylene, may have a comonomer, such as hexene, incorporated into the polyethylene backbone. These copolymers provide varying physical properties compared to polyethylene alone and can be produced in a low pressure reactor, utilizing, for example, solution, slurry, or gas phase polymerization processes. Polymerization may take place in the presence of catalyst systems such as those employing a Ziegler-Natta catalyst, a chromium based catalyst, or a metallocene catalyst. The comonomer content of a polyolefin (e.g., wt % of comonomer incorporated into a polyolefin backbone) influences the properties of the polyolefin (and composition of the copolymers) and is influenced by the polymerization catalyst.

A copolymer composition, such as a resin, has a composition distribution, which refers to the distribution of comonomer that forms short chain branches along the copolymer backbone. When the amount of short chain branches varies among the copolymer molecules, the composition is said to have a "broad" composition distribution. When the amount of comonomer per 1,000 carbons is similar among the copolymer molecules of different chain lengths, the composition distribution is said to be "narrow".

Like comonomer content, the composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

Polyolefin compositions may have broad composition distributions that include a first polyolefin component having low molecular weight and low comonomer content while a second polyolefin component has a high molecular weight and high comonomer content. Compositions having this broad orthogonal composition distribution (BOCD) in which the comonomer is incorporated predominantly in the high molecular weight chains can provide improved physical properties, for example toughness properties and environmental stress crack resistance (ESCR).

Also, like comonomer content, a composition distribution of a copolymer composition is influenced by the identity of the catalyst used to form the polyolefins of the composition. Ziegler-Natta catalysts and chromium based catalysts generally produce compositions with broad composition distributions, whereas metallocene catalysts typically produce compositions with narrow composition distributions.

Nonetheless, polyolefin compositions formed by catalysts capable of forming high molecular weight polyolefins typically also have a broad molecular weight distribution (MWD), as indicated by high polydispersity indices, and/or the polyolefins are of such high molecular weight (e.g., Mw of 1,500,000 or more) as to have processing difficulties due to hardness. Furthermore, catalysts capable of forming high molecular weight polyolefins typically have low activity (e.g., amount of desirable polymer produced per a period of time).

References of interest include: Dornow, A., Petsch, G., Archiv der Pharmazie und Berichte der Deutschen Pharmazeutischen Gesellschaft (1951), 284, 153; Amdts, D., Loesel, W., Roos, O., Ger. Offen. (1993), DE 4220353 A1 19931223; and Majima, K., Tosaki, S., Ohshima, T., Shibasaki, M., *Tetrahedron Lett.,* 2005, 46(32), pp. 5377-5381; WO 2013/101476; WO 2013/101478; CN 105418672.

SUMMARY

This invention relates to catalyst compounds represented by Formula (I):

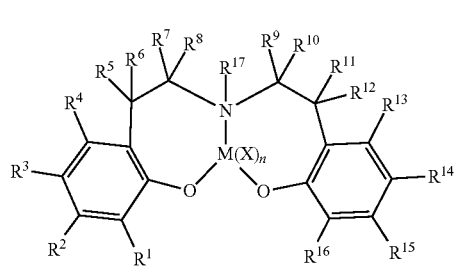

wherein:
M is a group 4 metal;
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, and $R^{17}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, or $R^{17}$ are joined together to form a $C_4$-$C_{62}$ cyclic or polycyclic ring structure, or a combination thereof;
each X is independently $C_1$-$C_{20}$ hydrocarbyl, $C_1$-$C_{20}$ substituted hydrocarbyl, a heteroatom or a heteroatom-containing group, or two or more Xs join together to form a $C_4$-$C_{62}$ cyclic or polycyclic ring structure; and
n is 2 or 3.

In yet another embodiment, the present disclosure provides a catalyst system including an activator and a catalyst of the present disclosure.

In yet another embodiment, the present disclosure provides a catalyst system including an activator, a catalyst support, and a catalyst of the present disclosure.

In still another embodiment, the present disclosure provides a polymerization process including a) contacting one or more olefin monomers with a catalyst system including: i) an activator and ii) a catalyst of the present disclosure.

In still another embodiment, the present disclosure provides a polyolefin formed by a catalyst system and or method of the present disclosure.

DETAILED DESCRIPTION

The present disclosure provides catalyst compounds including a tridentate ethylene bridged amine bis(phenolate), catalyst systems including such, and uses thereof. In at least one embodiment, the present disclosure is directed to catalyst compounds, catalyst systems, and their use in polymerization processes to produce polyolefin polymers, such as polyethylene polymers and polypropylene polymers. Catalyst compounds of the present disclosure can be zirconium or hafnium-containing compounds having a tridentate ethylene bridged amine bis(phenolate). In another class of embodiments, the present disclosure is directed to polymerization processes to produce polyolefin polymers from catalyst systems including one or more olefin polymerization catalysts, at least one activator, and an optional support.

For example, the present disclosure provides polymerization processes to produce a polyethylene polymer, the process including contacting a catalyst system including one or more non-metallocene catalyst compounds, at least one activator, and at least one optional support, with ethylene and one or more $C_3$-$C_{10}$ alpha-olefin comonomers under polymerization conditions.

Catalysts, catalyst systems, and processes of the present disclosure can provide polyolefins at high activity values (e.g., 250 gP/mmolCat·h$^{-1}$ or greater), and or having one or more of: high Mw (e.g., 350,000 g/mol or greater), Mn values of 190,000 g/mol or greater, narrow Mw/Mn (e.g., about 2.0), high Tm values (e.g., 124° C. or greater). Catalysts, catalyst systems, and processes of the present disclosure can provide polymers having a high comonomer content (e.g., 8.5 wt % or greater).

For the purposes of the present disclosure, the numbering scheme for the Periodic Table Groups is used as described in CHEMICAL AND ENGINEERING NEWS, 63(5), pg. 27 (1985). Therefore, a "group 4 metal" is an element from group 4 of the Periodic Table, e.g., Hf, Ti, or Zr.

The specification describes transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which, without being bound by theory, is believed to create a cation as a result of the removal of an anionic group, often referred to as a leaving group, from the transition metal.

As used herein, "olefin polymerization catalyst(s)" refers to any catalyst, such as an organometallic complex or compound that is capable of coordination polymerization addition where successive monomers are added in a monomer chain at the organometallic active center.

Unless otherwise indicated, as used herein, "high molecular weight" is defined as a number average molecular weight (Mn) value of 100,000 g/mol or more as determined by Gel Permeation Chromatography. "Low molecular weight" is defined as an Mn value of less than 100,000 g/mol as determined by Gel Permeation Chromatography.

Unless otherwise indicated, as used herein, "low comonomer content" is defined as a polyolefin having less than 8 wt % of comonomer based upon the total weight of the polyolefin.

As used herein, "high comonomer content" is defined as a polyolefin having greater than or equal to 8 wt % of comonomer based upon the total weight of the polyolefin.

The terms "substituent," "radical," "group," and "moiety" may be used interchangeably.

As used herein, and unless otherwise specified, the term "$C_n$," means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

"Catalyst productivity" is a measure of how many grams of polymer (P) are produced using a polymerization catalyst including W g of catalyst (cat), over a period of time of T hours; and may be expressed by the following formula: P/(T×W) and expressed in units of gP/gcat/hr. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used per hour (gP/molcat/hr).

"BOCD" refers to a Broad Orthogonal Composition Distribution in which the comonomer of a copolymer is incorporated predominantly in the high molecular weight chains or species of a polyolefin polymer or composition. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights of polymer chains. BOCD has been described, for example, in U.S. Pat. No. 8,378,043, Col. 3, line 34 to Col. 4, line 19, and U.S. Pat. No. 8,476,392, Col. 15, line 43 to Col. 16, line 53, in event of conflict U.S. Pat. No. 8,476,392 shall control.

An "olefin," alternatively referred to as "alkene," is a linear, branched, or cyclic compound of carbon and hydrogen having at least one double bond. For purposes of this specification and the claims appended thereto, when a polymer or copolymer is referred to as including an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polyolefin" has two or more of the same or different olefin mer units. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" is used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on.

For the purposes of the present disclosure, ethylene shall be considered an α-olefin.

For purposes of the present disclosure and claims thereto, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group.

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are g/mol.

Unless otherwise noted all melting points (Tm) are DSC second melt.

Unless otherwise noted all DSC melt enthalpy ($\Delta H_f$) are in J/g.

The following abbreviations may be used herein: dme is 1,2-dimethoxyethane, Me is methyl, Ph is phenyl, Et is ethyl, Pr is propyl, iPr is isopropyl, n-Pr is normal propyl, Bu is butyl, cPR is cyclopropyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., $CH_2Ph$), THF (also referred to as thf) is tetrahydrofuran, RT is room temperature (and is 23° C. unless otherwise indicated), tol is toluene, EtOAc is ethyl acetate, Cy is cyclohexyl, Cp is cyclopentadienyl, Cp* is pentamethyl cydopentadienyl, and Ind is indenyl.

A "catalyst system" includes at least one catalyst compound and at least one activator. When "catalyst system" is used to describe such the catalyst compound/activator combination before activation, it means the unactivated catalyst complex (precatalyst) together with an activator and, optionally, a co-activator. When it is used to describe the combination after activation, it means the activated complex and the activator or other charge-balancing moiety. The transition metal compound may be neutral as in a precatalyst, or a charged species with a counter ion as in an activated catalyst system. For the purposes of the present disclosure, when catalyst systems are described as including neutral stable forms of the components, it is well understood by one of ordinary skill in the art, that the ionic form of the component is the form that reacts with the monomers to produce polymers.

In the description herein, a catalyst compound may be described as a catalyst precursor, a pre-catalyst compound, catalyst compound or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion. Activator and cocatalyst are also used interchangeably.

A scavenger is a compound that may be added to facilitate polymerization by scavenging impurities. Some scavengers may also act as activators and may be referred to as co-activators. A co-activator, that is not a scavenger, may also be used in conjunction with an activator in order to form an active catalyst. In at least one embodiment, a co-activator can be pre-mixed with the transition metal compound to form an alkylated transition metal compound.

Non-coordinating anion (NCA) is an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

For purposes of the present disclosure, in relation to catalyst compounds, the term "substituted" means that a hydrogen group has been replaced with a hydrocarbyl group, a heteroatom, or a heteroatom containing group.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In at least one embodiment, the alkyl group may include at least one aromatic group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals can include methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one halogen (such as Br, Cl, F, or I) or at least one functional group, such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like, or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals can include ethenyl, propenyl, allyl, 1,4-butadienyl cyclopropenyl, cyclobutenyl, cyclopentenyl, cyclohexenyl, cyclooctenyl, and the like, including their substituted analogues.

The term "alkoxy" or "alkoxide" means an alkyl ether or aryl ether radical where the term alkyl is as defined above. Examples of suitable alkyl ether radicals can include methoxy, ethoxy, n-propoxy, iso-propoxy, n-butoxy, iso-butoxy, sec-butoxy, tert-butoxy, phenoxyl, and the like.

The term "aryl" or "aryl group" means a six carbon aromatic ring and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom-substituted ring.

The term "continuous" means a system that operates without interruption or cessation. For example, a continuous process to produce a polymer would be one where the reactants are continually introduced into one or more reactors and polymer product is continually withdrawn until the polymerization is stopped.

A solution polymerization means a polymerization process in which the polymer is dissolved in a liquid polymerization medium, such as an inert solvent or monomer(s) or their blends. A solution polymerization is homogeneous. A homogeneous polymerization is one where the polymer product is dissolved in the polymerization medium. Suitable systems may not turbid as described in Oliveira, J. V. et al. (2000) "High-Pressure Phase Equilibria for Polypropylene-Hydrocarbon Systems," *Ind. Eng. Chem. Res.*, v. 39(12), p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, such as less than 10 wt %, such as less than 1 wt %, such as 0 wt %.

U.S. Pat. No. 9,290,593 ('593 patent) teaches a BOCD Index. The BOCD Index may be defined by the following equation:

BOCD Index=(Content of SCB at the high molecular weight side−Content of SCB at the low molecular weight side)/(Content of SCB at the low molecular weight side), where the "Content of SCB at the high molecular weight side" means the content of the SCB (the number of branches/1,000 carbon atoms) included in a polymer chain having a molecular weight of Mw of the polyolefin or more and 1.3×Mw or less, and the "Content of SCB at the low molecular weight side" means the content of the SCB (the number of branches/1,000 carbon atoms) included in a polymer chain having a molecular weight of 0.7×Mw of the polyolefin or more and less than Mw. The BOCD Index defined by the equation above may be in the range of 1 to 5, such as 2 to 4, such as 2 to 3.5. See, also, FIG. 1 and FIG. 2 of the '593 patent (characterizing BOCD polymer structures using GPC-FTIR data).

The breadth of the composition distribution is characterized by the $T_{75}$-$T_{25}$ value, where $T_{25}$ is the temperature at which 25% of the eluted polymer is obtained and $T_{75}$ is the temperature at which 75% of the eluted polymer is obtained in a TREF experiment as described in U.S. Pat. No. 8,378,043, Col. 3, line 34 to Col. 4, line 19, and U.S. Pat. No. 8,476,392, Col. 15, line 43 to Col. 16, line 53. The composition distribution is further characterized by the $F_{80}$ value, which is the fraction of polymer that elutes below 80° C. in a TREF-LS experiment as described in U.S. Pat. No. 8,378,043, Col. 3, line 34 to Col. 4, line 19, and U.S. Pat. No. 8,476,392, Col. 15, line 43 to Col. 16, line 53. A higher $F_{80}$ value indicates a higher fraction of comonomer in the polymer molecule. An orthogonal composition distribution is defined by a $M_{60}/M_{90}$ value that is greater than 1, where $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described in U.S. Pat. No. 8,378,043, Col. 3, line 34 to Col. 4, line 19, and U.S. Pat. No. 8,476,392, Col. 15, line 43 to Col. 16, line 53.

In at least one embodiment, a polymer has a BOCD characterized in that the $T_{75}$-$T_{25}$ value is 1 or greater, 2 or greater, 2.5 or greater, 4 or greater, 5 or greater, 7 or greater, 10 or greater, 11.5 or greater, 15 or greater, 17.5 or greater, 20 or greater, 25 or greater, 30 or greater, 35 or greater, 40 or greater, or 45 or greater, where $T_{25}$ is the temperature at which 25% of the eluted polymer is obtained and $T_{75}$ is the temperature at which 75% of the eluted polymer is obtained in a TREF experiment as described in U.S. Pat. No. 8,378,043, Col. 3, line 34 to Col. 4, line 19, and U.S. Pat. No. 8,476,392, Col. 15, line 43 to Col. 16, line 53.

The polymers as described herein may further have a BOCD characterized in that $M_{60}/M_{90}$ value is 1.5 or greater, 2 or greater, 2.25 or greater, 2.5 or greater, 3 or greater, 3.5 or greater, 4 or greater, 4.5 or greater, or 5 or greater, where $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described in U.S. Pat. No. 8,378,043, Col. 3, line 34 to Col. 4, line 19, and U.S. Pat. No. 8,476,392, Col. 15, line 43 to Col. 16, line 53.

Additionally, the polymers as described herein may further have a BOCD characterized in that $F_{80}$ value is 1% or greater, 2% or greater, 3% or greater, 4% or greater, 5% or greater, 6% or greater, 7% or greater, 10% or greater, 11% or greater, 12% or greater, or 15% or greater, where $F_{80}$ is the fraction of polymer that elutes below 80° C.

Transition Metal Complexes

In at least one embodiment, the present disclosure relates to novel bridged non-metallocene transition metal complexes, where the complexes include at least one $C_4$-$C_{62}$ cyclic or polycyclic ring structure with particular combinations of substituents and bridged with, for example, a tridentate ethylene bridged amine bis(phenolate) group. In at least one embodiment, the bridge is characterized in that it has at least one functionality, either included in the bridge or bonded to it.

In at least one embodiment, a catalyst compound, and catalyst systems including such compounds, is represented by formula (I):

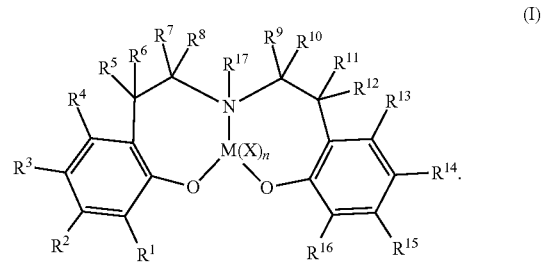

M is a group 4 metal. Group 4 metals include zirconium, titanium, and hafnium. In at least one embodiment, M is zirconium or hafnium.

In at least one embodiment, each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, and $R^{17}$ is independently hydrogen, a halogen atom (such as Br, Cl, F, or I), $C_1$-$C_{40}$ hydrocarbyl or $C_1$-$C_{40}$ substituted hydrocarbyl, such as methyl, ethyl, propyl, butyl, pentyl, hexyl, heptyl, octyl, nonyl, decyl, undecyl, dodecyl, phenyl, substituted phenyl, biphenyl or an isomer thereof, which may be halogenated, including perfluoropropyl, perfluorobutyl, perfluoroethyl, perfluoromethyl, and substituted hydrocarbyl radicals and all isomers of substituted hydrocarbyl radicals including trimethylsilylpropyl, trimethylsilylmethyl, trimethylsilylethyl, and phenyl, and all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, dipropylmethylphenyl, and the like; a heteroatom or a heteroatom-containing group (such as O, N, P, or S), or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, or $R^{17}$ are joined together to form a $C_4$-$C_{62}$ cyclic or polycyclic ring structure, or a combination thereof, such as in at least one embodiment, A heteroatom can be a halogen atom (such as Br, Cl, F, or I). $R^{17}$ can be hydrogen or $C_1$-$C_{40}$ hydrocarbyl, such as $C_1$-$C_{40}$ hydrocarbyl. Alternately, $R^{17}$ is hydrogen.

In at least one embodiment, each X is independently $C_1$-$C_{20}$ hydrocarbyl or $C_1$-$C_{20}$ substituted hydrocarbyl which include, but are not limited to, methyl, ethyl, propyl, butyl, pentyl, hexyl, heptyl, octyl, nonyl, decyl, undecyl, dodecyl, phenyl, substituted phenyl, biphenyl or an isomer thereof, including perfluoropropyl, perfluorobutyl, perfluoroethyl, perfluoromethyl, and substituted hydrocarbyl radicals and all isomers of substituted hydrocarbyl radicals including trimethylsilylpropyl, trimethylsilylmethyl, trimethylsilylethyl, and phenyl, and all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, dipropylmethylphenyl, and the like. Alternately, each X is independently a heteroatom or a heteroatom-containing group (such as O, N, P, S), or two or more Xs join together to form a $C_4$-$C_{62}$ cyclic or polycyclic ring structure. Particularly, each X can be selected from methyl, benzyl, or chloro, such as X is benzyl.

In at least one embodiment, n is 2 or 3, such as n is 2.

In at least one embodiment, $R^1$ and or $R^{16}$ is represented by the structure:

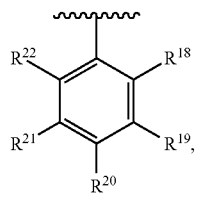

where each of $R^{18}$, $R^{19}$, $R^{20}$, $R^{21}$, and $R^{22}$ is independently selected from hydrogen, $C_1$-$C_{40}$ hydrocarbyl or $C_1$-$C_{40}$ substituted hydrocarbyl, such as methyl, ethyl, propyl, butyl, pentyl, hexyl, heptyl, octyl, nonyl, decyl, undecyl, dodecyl, phenyl, substituted phenyl, biphenyl or an isomer thereof, including perfluoropropyl, perfluorobutyl, perfluoroethyl, perfluoromethyl, and substituted hydrocarbyl radicals and all isomers of substituted hydrocarbyl radicals including trimethylsilylpropyl, trimethylsilylmethyl, trimethylsilylethyl, and phenyl, and all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, dipropylmethylphenyl, and the like, a heteroatom or a heteroatom-containing group (such as O, N, P, S), or two or more of $R^{18}$, $R^{19}$, $R^{20}$, $R^{21}$, and $R^{22}$ are joined together to form a $C_4$-$C_{62}$ cyclic or polycyclic ring structure, or a combination thereof.

In at least one embodiment, $R^{18}$, $R^{19}$, $R^{20}$, $R^{21}$, and $R^{22}$ is independently selected from hydrogen and $C_1$-$C_{40}$ hydrocarbyl, such as each of $R^{18}$, $R^{19}$, $R^{20}$, $R^{21}$, and $R^{22}$ is hydrogen.

In at least one embodiment, each of $R^5$, $R^6$, $R^7$, $R^8$, $R^9$, $R^{10}$, $R^{11}$, and $R^{12}$ is independently hydrogen and $C_1$-$C_{10}$ hydrocarbyl, such as two or more of $R^5$, $R^6$, $R^7$, and $R^8$ are hydrogen and two or more of $R^9$, $R^{10}$, $R^{11}$, and $R^{12}$ are hydrogen. Alternately, each of $R^5$, $R^6$, $R^7$, $R^8$, $R^9$, $R^{10}$, $R^{11}$, and $R^{12}$ is hydrogen.

In at least one embodiment, the catalyst compound represented by Formula (I) is selected from:

1

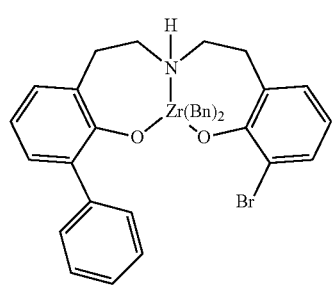

2

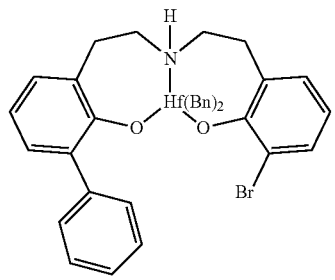

3

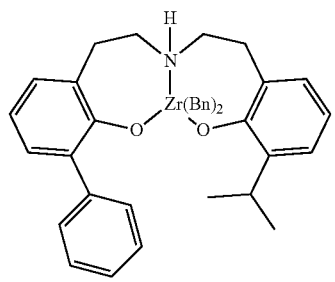

4

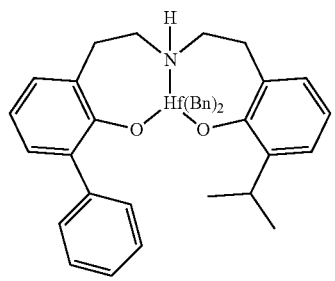

5

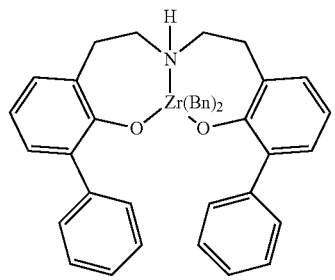

6

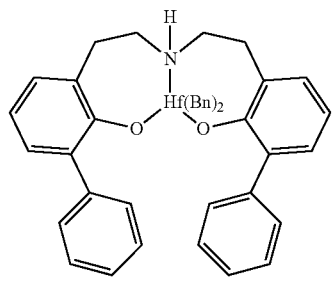

7

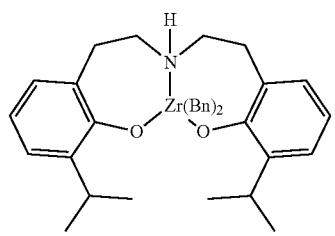

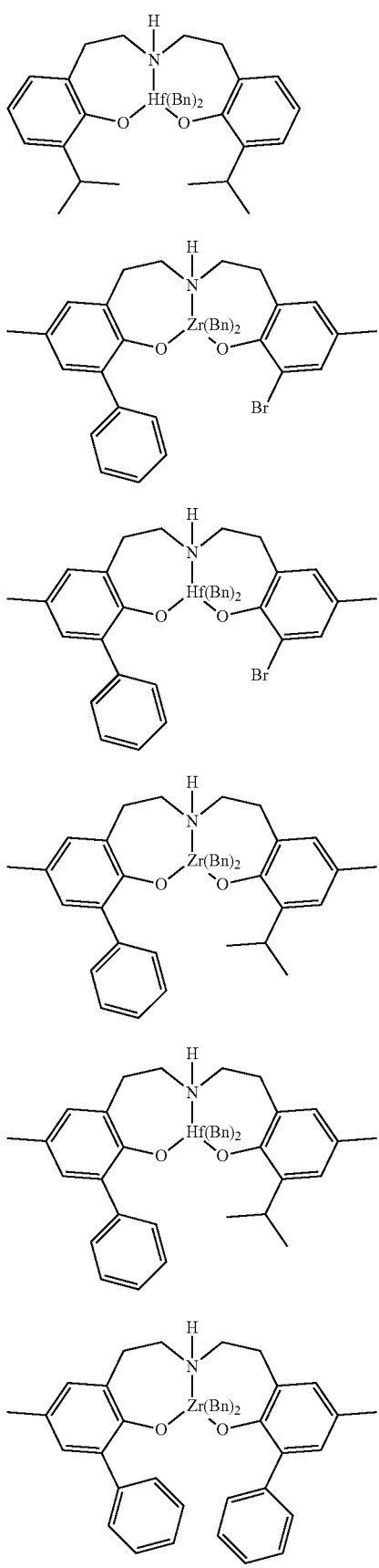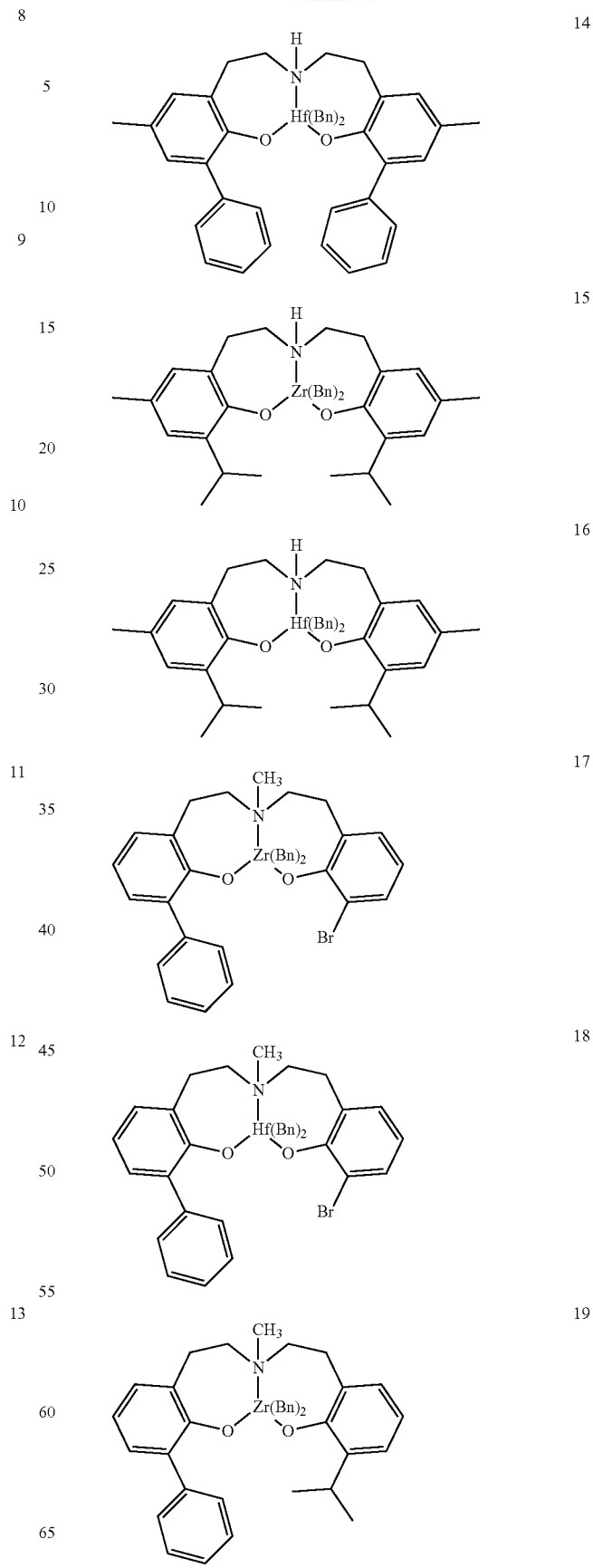

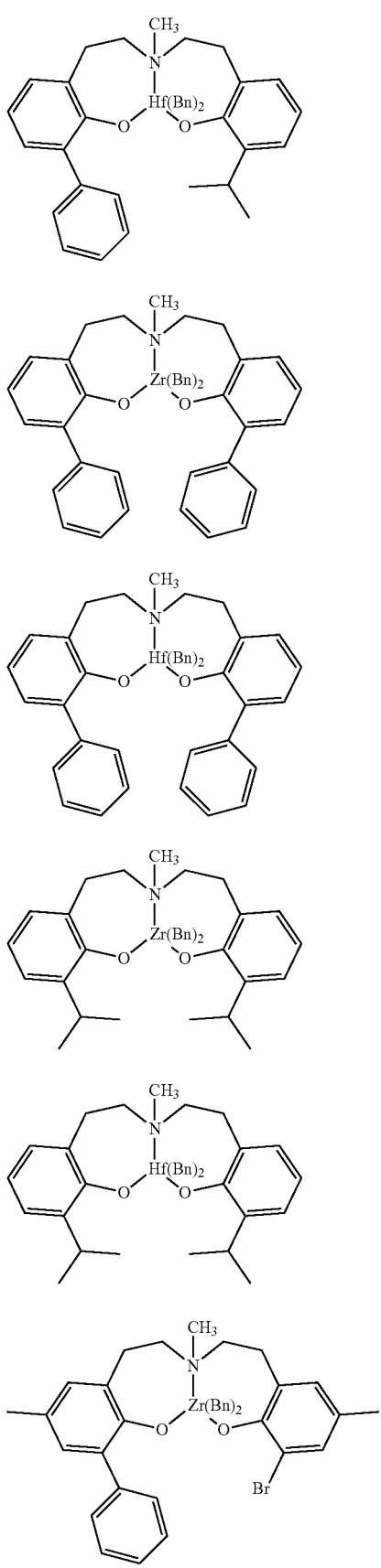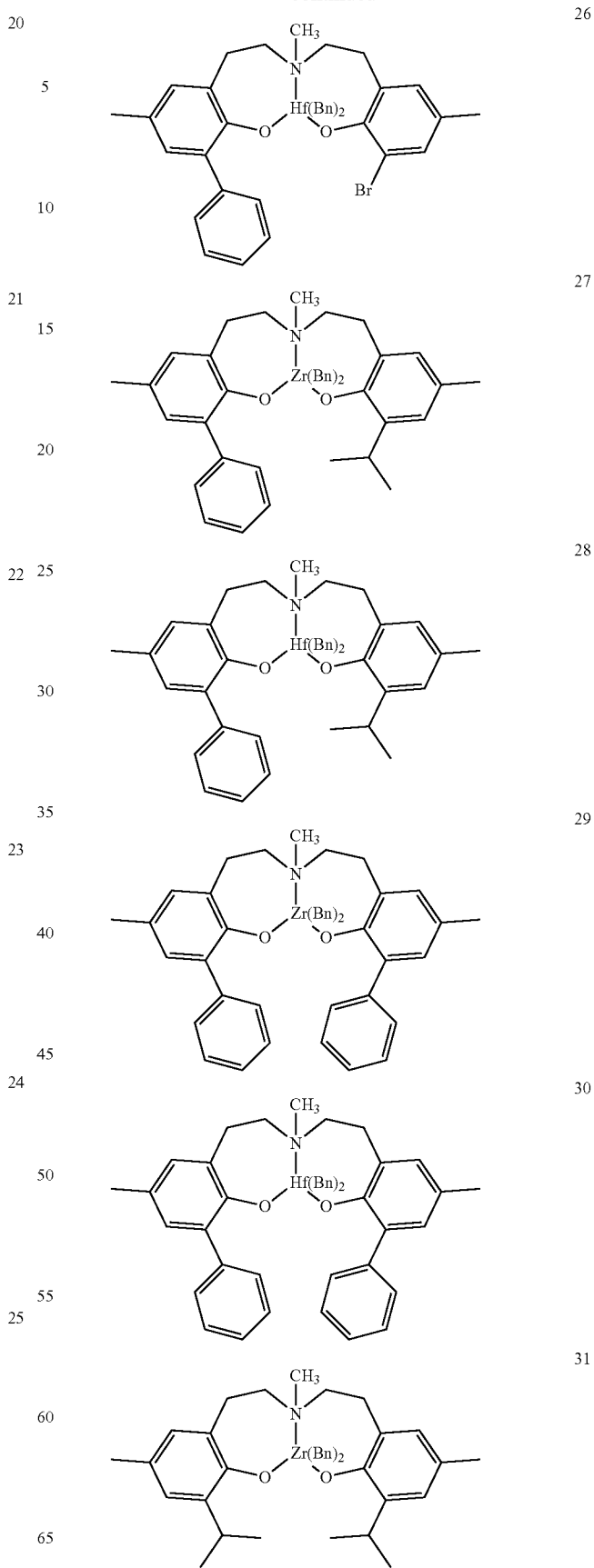

In at least one embodiment, the catalyst compound represented by Formula (I) is selected from:

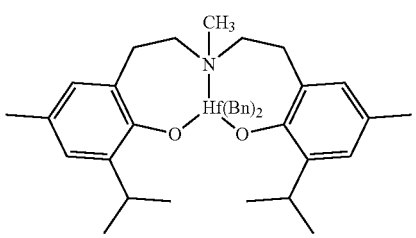
32

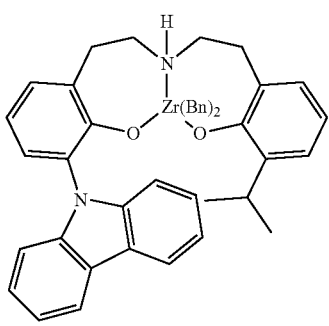
33

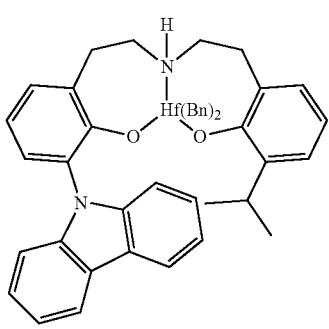
34

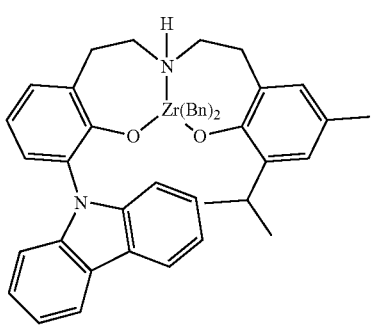
35

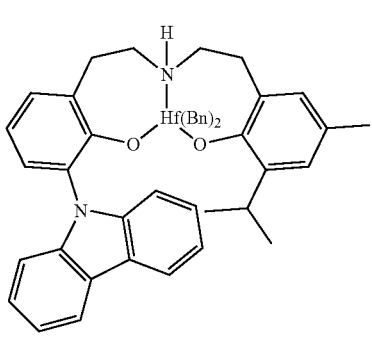
36

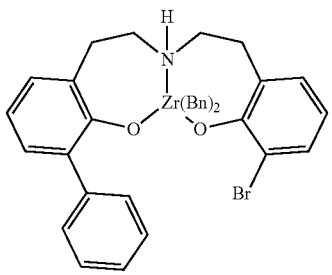
1

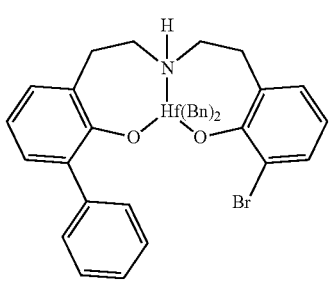
2

In at least one embodiment, one or more different catalyst compounds are present in a catalyst system. In at least one embodiment, one or more different catalyst compounds are present in the reaction zone where the process(es) described herein occur. When at least two transition metal compound based catalysts are used in one reactor as a mixed catalyst system, the two transition metal compounds can be chosen such that the two are compatible. A simple screening method such as by $^1$H or $^{13}$C NMR, known to those of ordinary skill in the art, can be used to determine which transition metal compounds are compatible. The same activator can be used for the transition metal compounds, however, two different activators, such as a non-coordinating anion activator and an alumoxane, can be used in combination. If one or more transition metal compounds contain an X ligand which is not a hydride, hydrocarbyl, or substituted hydrocarbyl, then the alumoxane should be contacted with the transition metal compounds prior to addition of the non-coordinating anion activator.

The two transition metal compounds (pre-catalysts) may be used in any ratio. Molar ratios of (A) transition metal compound to (B) transition metal compound can be a range of (A:B) of from 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In at least one embodiment, when using the two pre-catalysts, where both are activated with the same activator, mole percentages, based upon the molecular weight of the pre-catalysts, can be from 10% to 99.9% A to 0.1% to 90% B, alternatively 25% to 99% A to 0.5% to 75% B, alternatively 50% to 99% A to 1% to 50% B, and alternatively 75% to 99% A to 1% to 10% B.

Methods to Prepare the Catalyst Compounds.

The following is a generic scheme to prepare a catalyst described herein and further exemplified in the examples. Generally, catalyst compounds of this type can be synthesized as shown below where the protected ethylamine (A) and the protected ketone (B) are condensed, then deprotected under acidic conditions in order to form the desired ligand, which can be further complexed to tetrabenzyl-M (with M=Zr or Hf). The protected ethylamine (A) can be synthesized from the 2-phenylphenol which was converted into the 2-hydroxybiphenyl-3-carbaldehyde in the presence of a Lewis acid (MgCl$_2$) and paraformaldehyde, followed by the protection of the hydroxyl group with chloromethyl methyl ether (MOMCl). The aldehyde can then be converted to the ethylamine (A) in the presence of nitromethane and ammonium acetate in order to form the nitro derivative, followed by the reduction into ethylamine (A) (having the amino moiety) using lithium aluminum hydride. The ketone (B) can be formed using 2-bromo-4-methylphenol as starting material. Allylation and rearrangement of the starting material using allyl bromide and potassium carbonate at high temperature yields the 2-allyl-6-bromo-4-methylphenol. Protection of the hydroxyl moiety, followed by ozonolysis can provide protected ketone (B). Compounds (A) and (B) can undergo nucleophilic condensation in order to form an imine (C), which can be reduced via the sodium triacetoxyborohydride reducing agent in order to form a ligand compound (D). The resulting ligand (D) can undergo metallation with tetrabenzyl-M (with M=Zr or Hf), thus yielding to the desired catalyst.

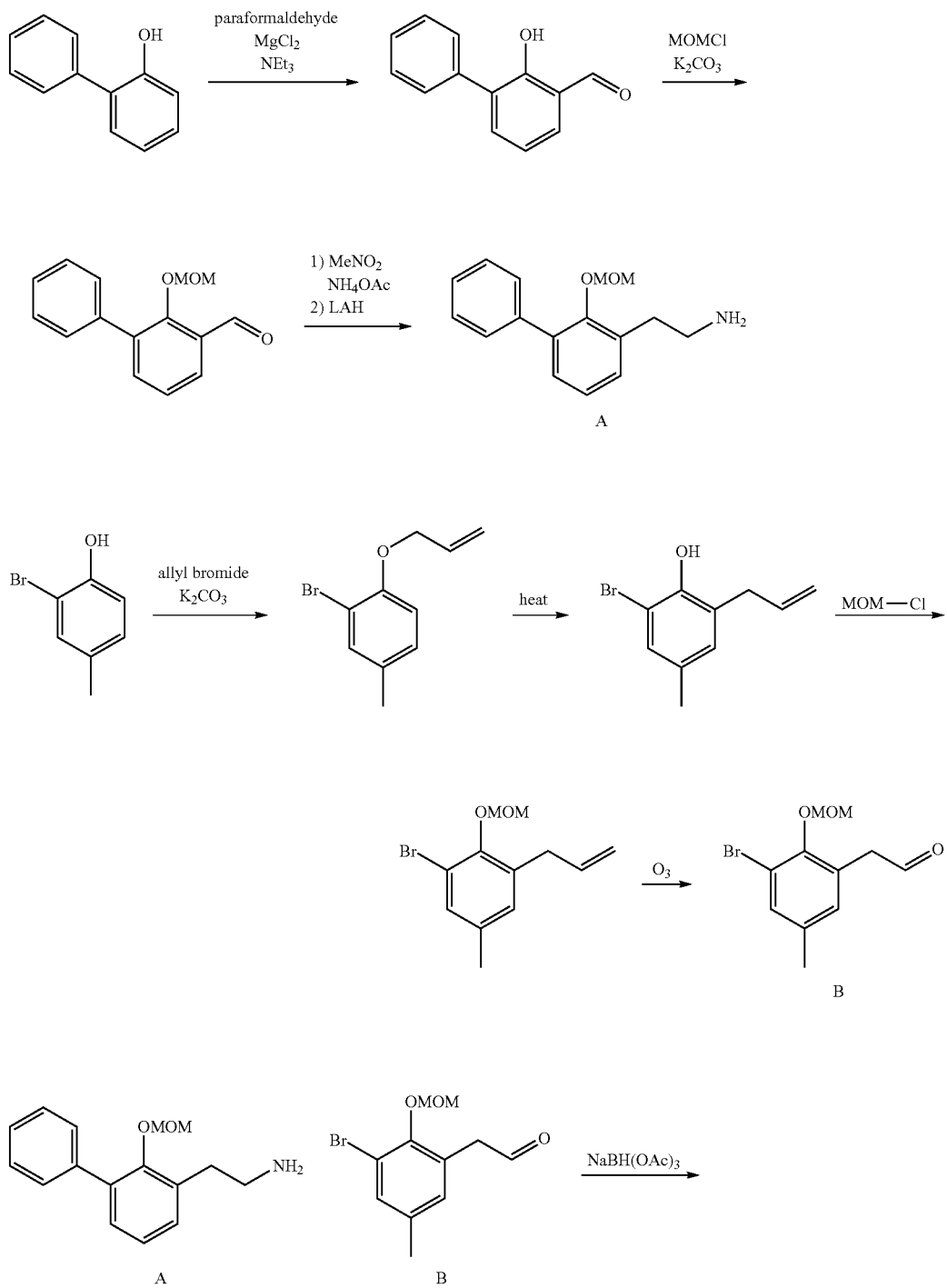

-continued

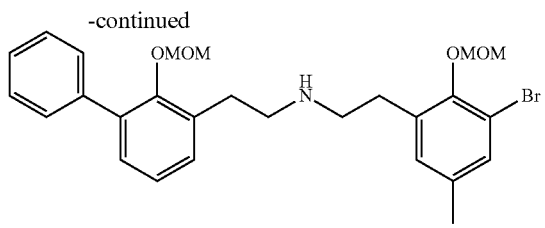

C

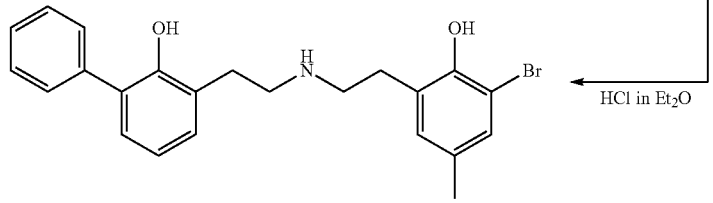

D

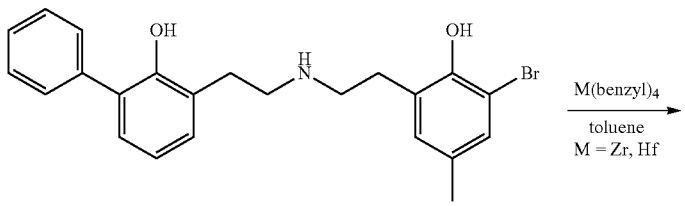 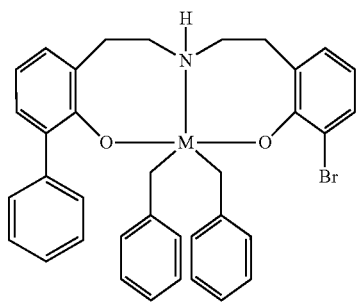

D

Zr = Catalyst 1
Hf = Catalyst 2

Activators

The terms "cocatalyst" and "activator" are used herein interchangeably and are defined to be any compound which can activate any one of the catalyst compounds described above by converting the neutral catalyst compound to a catalytically active catalyst compound cation.

After the complexes described above have been synthesized, catalyst systems may be formed by combining them with activators in any suitable manner including by supporting them for use in slurry or gas phase polymerization. The catalyst systems may also be added to or generated in solution polymerization or bulk polymerization (in the monomer). Suitable catalyst systems may include a complex as described above and an activator such as alumoxane or a non-coordinating anion.

Non-limiting activators, for example, include alumoxanes, aluminum alkyls, ionizing activators, which may be neutral or ionic, and conventional-type cocatalysts. Activators can include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

In at least one embodiment, the catalyst system includes an activator and the catalyst compound of formula (I).

In at least one embodiment, the catalyst system further includes a support material.

In at least one embodiment, the catalyst system includes a support material selected from $Al_2O_3$, $ZrO_2$, $SiO_2$, $SiO_2/Al_2O_3$, $SiO_2/TiO_2$, silica clay, silicon oxide/clay, or mixtures thereof.

In at least one embodiment, the catalyst system contains an activator that includes an alkylalumoxane.

Alumoxane Activators

In one embodiment, alumoxane activators are utilized as an activator in the catalyst system. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be suitable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584). Another useful alumoxane is solid polymethylaluminoxane as described in U.S. Pat. Nos. 9,340,630; 8,404,880; and 8,975,209. Aluminum alkyls are available as hydrocarbon solutions from commercial sources. Methylalumoxane ("MAO") is available from Albemarle as a 30 wt % solution in toluene.

When the activator is an alumoxane (modified or unmodified), in at least one embodiment, select the maximum amount of activator at up to a 5000-fold molar excess Al/M over the catalyst compound (per metal catalytic site). The minimum activator-to-catalyst-compound is a 1:1 molar ratio. Alternate ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. For example, alumoxane is present at zero mole %, alternately the alumoxane is present at a molar ratio of aluminum to catalyst compound transition metal less than 500:1, such as less than 300:1, such as less than 100:1, such as less than 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

"Compatible" non-coordinating anions can be those which are not degraded to neutrality when the initially formed complex decomposes. Further, the anion might not transfer an anionic substituent or fragment to the cation so as to cause it to form a neutral transition metal compound and a neutral by-product from the anion. Non-coordinating anions can be those that are compatible, stabilize the transition metal cation in the sense of balancing its ionic charge at +1, and yet retain sufficient lability to permit displacement during polymerization.

It is within the scope of the present disclosure to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of the present disclosure to use neutral or ionic activators alone or in combination with alumoxane or modified alumoxane activators.

The catalyst systems of the present disclosure can include at least one non-coordinating anion (NCA) activator. In at least one embodiment, boron containing NCA activators represented by the formula below can be used:

$$Z_d^+(A^{d-})$$

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand containing transition metal catalyst precursor, resulting in a cationic transition metal species.

The activating cation $Z_d^+$ may also be a moiety such as silver, tropylium, carboniums, ferroceniums and mixtures, such as carboniums and ferroceniums. $Z_d^+$ can be triphenyl carbonium. Reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), such as the reducible Lewis acids in formula (14) above as "Z" include those represented by the formula: $(Ph_3C)$, where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbonium.

When $Z_d^+$ is the activating cation $(L-H)_d^+$, it can be a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ where k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Each Q can be a fluorinated hydrocarbyl group having 1 to 20 carbon atoms, such as each Q is a fluorinated aryl group, and such as each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as (and particularly those specifically listed as) activators in U.S. Pat. No. 8,658,556, which is incorporated by reference herein.

The ionic stoichiometric activator $Z_d^+$ $(A^{d-})$ can be one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

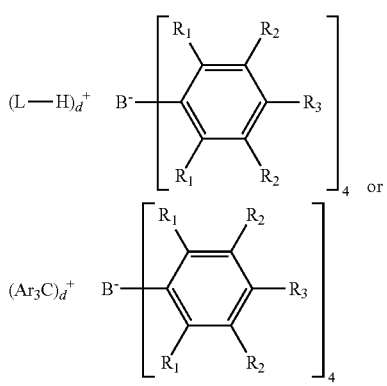

where:
each $R_1$ is independently a halide, such as a fluoride;
Ar is substituted or unsubstituted aryl group (such as a substituted or unsubstituted phenyl), such as substituted with $C_1$ to $C_{40}$ hydrocarbyls, such as $C_1$ to $C_{20}$ alkyls or aromatics;
each $R_2$ is independently a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (such as $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (such as $R_3$ is a fluoride or a $C_6$ perfluorinated aromatic hydrocarbyl group); where $R_2$ and $R_3$ can form one or more saturated or unsaturated, substituted or unsubstituted rings (such as $R_2$ and $R_3$ form a perfluorinated phenyl ring); and
L is a neutral Lewis base; $(L-H)^+$ is a Bronsted acid; d is 1, 2, or 3;
where the anion has a molecular weight of greater than 1020 g/mol; and
where at least three of the substituents on the B atom each have a molecular volume of greater than 250 cubic Å, alternately greater than 300 cubic Å, or alternately greater than 500 cubic Å.

For example, $(Ar_3C)_d^+$ can be $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in Girolami, G. S. (1994) "A Simple "Back of the Envelope" Method for Estimating the Densities and Molecular Volumes of Liquids and Solids," *Journal of Chemical Education*, v. 71(11), November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| 1st short period, Li to F | 2 |
| 2nd short period, Na to Cl | 4 |
| 1st long period, K to Br | 5 |
| 2nd long period, Rb to I | 7.5 |
| 3rd long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Exemplary activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4^-]$, 1-(4-(tris(pentafluorophenyl)borate)-2,3,5,6-tetrafluorophenyl)pyrrolidinium, and tetrakis(pentafluorophenyl)borate, 4-(tris(pentafluorophenyl)borate)-2,3,5,6-tetrafluoropyridine.

In at least one embodiment, the activator includes a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, and triphenylcarbenium tetrakis(3,5-bis(trifluoromethyl)phenyl)borate).

In another embodiment, the activator includes one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, and di-(i-propyl)ammonium tetrakis(pentafluorophenyl)borate (where alkyl is methyl, ethyl, propyl, n-butyl, sec-butyl, or t-butyl).

Suitable activator-to-catalyst ratio, e.g., all NCA activators-to-catalyst ratio may be about a 1:1 molar ratio. Alternate ranges include from 0.1:1 to 100:1, alternately from 0.5:1 to 200:1, alternately from 1:1 to 500:1, alternately from 1:1 to 1000:1. A particularly useful range is from 0.5:1 to 10:1, such as 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 94/07928; and WO 95/14044 which discuss the use of an alumoxane in combination with an ionizing activator).

Useful chain transfer agents can be alkylalumoxanes, a compound represented by the formula $AlR_3$, $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Optional Support Materials

In embodiments herein, the catalyst system may include an inert support material. The supported material can be a porous support material, for example, talc, and inorganic oxides. Other support materials include zeolites, clays, organoclays, or any other organic or inorganic support material and the like, or mixtures thereof.

The support material can be an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Support materials include $Al_2O_3$, $ZrO_2$, $SiO_2$, and combinations thereof, such as $SiO_2$, $Al_2O_3$, or $SiO_2/Al_2O_3$.

The support material, such as an inorganic oxide, can have a surface area in the range of from about 10 $m^2/g$ to about 700 $m^2/g$, pore volume in the range of from about 0.1 $cm^3/g$ to about 4.0 $cm^3/g$ and average particle size in the range of from about 5 μm to about 500 μm. The surface area of the support material can be in the range of from about 50 $m^2/g$ to about 500 $m^2/g$, pore volume of from about 0.5 $cm^3/g$ to about 3.5 $cm^3/g$ and average particle size of from about 10 μm to about 200 μm. For example, the surface area of the support material is in the range is from about 100 $m^2/g$ to about 400 $m^2/g$, pore volume from about 0.8 $cm^3/g$ to about 3.0 $cm^3/g$ and average particle size is from about 5 μm to about 100 μm. The average pore size of the support material useful in the present disclosure is in the range of from 10 Å to 1000 Å, such as 50 Å to about 500 Å, and such as 75 Å to about 350 Å. In at least one embodiment, the support material is a high surface area, amorphous silica (surface area=300 $m^2/gm$; pore volume of 1.65 $cm^3/gm$). Silicas can be marketed under the tradenames of DAVISON 952 or DAVISON 955 by the Davison Chemical Division of W.R. Grace and Company. In other embodiments DAVISON 948 is used. Alternatively, a silica can be ES-70™ silica (PQ Corporation, Malvern, Pa.) that has been calcined at 875° C. or more.

The support material should be dry, that is, free of absorbed water. Drying of the support material can be effected by heating or calcining at about 100° C. to about 1,000° C., such as at least about 600° C. When the support material is silica, it is heated to at least 200° C., such as about 200° C. to about 850° C., and such as at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of the present disclosure. The calcined support material is then contacted with at least one polymerization catalyst comprising at least one catalyst compound and an activator.

The support material, having reactive surface groups, such as hydroxyl groups, is slurried in a non-polar solvent and the resulting slurry is contacted with a solution of a catalyst compound and an activator. In at least one embodiment, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In at least one embodiment, the supported catalyst system is generated in situ. In alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst compound, activator and support is heated to about 0° C. to about 70° C., such as about 23° C. to about 60° C., such as at room temperature. Contact times may range from about 0.5 hours to about 24 hours, from about 2 hours to about 16 hours, or from about 4 hours to about 8 hours.

Suitable non-polar solvents are materials in which all of the reactants used herein, i.e., the activator and the catalyst compound, are at least partially soluble and which are liquid at reaction temperatures. Non-polar solvents can be alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In at least one embodiment, the support material includes a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Bronsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In at least one embodiment, the activator-support can be, or can include, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, $H^+$, $[H(OEt_2)_2]^+$, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In at least one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, such as a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Polymerization Processes

The present disclosure relates to polymerization processes where monomer (such as propylene), and optionally comonomer, are contacted with a catalyst system comprising an activator and at least one catalyst compound, as described above. The catalyst compound and activator may be combined in any order, and are combined prior to contacting with the monomer.

Monomers include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer includes propylene and an optional comonomer comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer includes ethylene and an optional comonomer comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced herein at up to 10 wt %, such as at 0.00001 wt % to 1.0 wt %, such as 0.002 wt % to 0.5 wt %, such as 0.003 wt % to 0.2 wt %, based upon the total weight of the composition. In at least one embodiment, 500 ppm or less of diene is added to the polymerization, such as 400 ppm or less, such as 300 ppm or less. In other embodiments, at least 50 ppm of diene is added to the polymerization, or 100 ppm or more, or 150 ppm or more.

Diolefin monomers include any suitable hydrocarbon structure, such as $C_4$ to $C_{30}$, having at least two unsaturated bonds, where at least two of the unsaturated bonds are readily incorporated into a polymer by either a stereospecific or a non-stereospecific catalyst(s). The diolefin monomers can be selected from alpha, omega-diene monomers (i.e., di-vinyl monomers). The diolefin monomers can be linear di-vinyl monomers, such as those containing from 4 to 30 carbon atoms. Dienes can include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, for example dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes can include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be used. (A homogeneous polymerization process is a process where at least 90 wt % of the product is soluble in the reaction media.) A bulk homogeneous process can be used. (A bulk process is a process where monomer concentration in all feeds to the reactor is 70 volume % or more.) Alternately, no solvent or diluent is present or added in the reaction medium, (except for the small amounts used as the carrier for the catalyst system or other additives, or amounts found with the monomer; e.g., propane in propylene). In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. In at least one embodiment, the polymerization is run in a bulk process.

Polymerizations can be run at any temperature and/or pressure suitable to obtain the desired ethylene polymers. Suitable temperatures and/or pressures include a temperature in the range of from about 0° C. to about 300° C., such as about 20° C. to about 200° C., such as about 35° C. to about 150° C., such as from about 40° C. to about 120° C., such as from about 45° C. to about 80° C.; and at a pressure in the range of from about 0.35 MPa to about 10 MPa, such as from about 0.45 MPa to about 6 MPa, such as from about 0.5 MPa to about 4 MPa, such as from about 0.55 MPa to about 3 MPa, such as from about 0.60 MPa to about 2 MPa, such as from about 0.65 MPa to about 1 MPa (such as from about 0.95 psig to about 145 psig).

In a suitable polymerization, the run time of the reaction is up to 300 minutes, such as from about 5 minutes to 250 minutes, such as from about 10 minutes to 120 minutes, such as from about 20 minutes to 90 minutes, such as from about 30 minutes to 60 minutes.

In at least one embodiment, hydrogen is present in the polymerization reactor at a partial pressure of from 0.001 psig to 50 psig (0.007 to 345 kPa), such as from 0.01 psig to 25 psig (0.07 kPa to 172 kPa), such as 0.1 psig to 10 psig (0.7 kPa to 70 kPa).

In at least one embodiment, the activity of the catalyst is from about 150 g/mmol/hr to about 350 g/mmol/hr, such as from about 100 g/mmol/hr to about 300 g/mmol/hr, such as from about 200 g/mmol/hr to about 275 g/mmol/hr, such as from about 250 g/mmol/hr to about 275 g/mmol/hr.

In at least one embodiment, the conversion of olefin monomer is at least 10%, based upon polymer yield and the weight of the monomer entering the reaction zone, such as 20% or more, such as 30% or more, such as 50% or more, such as 80% or more.

In at least one embodiment, little or no alumoxane is used in the process to produce the polymers. For example, alumoxane is present at zero mol %, alternately the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. For example, scavenger (such as tri alkyl aluminum) is present at zero mol %, alternately the scavenger is present at a molar ratio of scavenger metal to transition metal of less than 100:1, such as less than 50:1, such as less than 15:1, such as less than 10:1.

In at least one embodiment, the polymerization: 1) is conducted at temperatures of 0 to 300° C. (such as 25 to 150° C., such as 40 to 120° C., such as 45 to 80° C.); 2) is conducted at a pressure of atmospheric pressure to 10 MPa (such as 0.35 to 10 MPa, such as from 0.45 to 6 MPa, such as from 0.5 to 4 MPa, such as from 0.65 to 1 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics are present in the solvent at less than 1 wt %, such as less than 0.5 wt %, such as at 0 wt % based upon the weight of the solvents), such as isohexane; 4) where the catalyst system used in the polymerization includes less than 0.5 mol %, such as 0 mol % alumoxane, alternately the alumoxane is present at a molar ratio of aluminum to transition metal less than 500:1, such as less than 300:1, such as less than 100:1, such as less than 1:1; 5) the polymerization occurs in one reaction zone; 6) the activity of the catalyst compound is at least 200 g/mmol/hr (such as at least 250 g/mmol/hr, such as at least 300 g/mmol/hr); 7) optionally scavengers (such as trialkyl aluminum compounds) are absent (e.g., present at zero mol %, alternately the scavenger is present at a molar ratio of scavenger metal to transition metal of less than 100:1, such as less than 50:1, such as less than 15:1, such as less than 10:1); and 8) optionally, hydrogen is present in the polymerization reactor at a partial pressure of 0.001 to 50 psig (0.007 to 345 kPa) (such as from 0.01 to 25 psig (0.07 to 172 kPa), such as 0.1 to 10 psig (0.7 to 70 kPa)). In at least one embodiment, the catalyst system used in the polymerization includes no more than one catalyst compound. A "reaction zone" also referred to as a "polymerization zone" is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. Room temperature is 23° C. unless otherwise noted.

Other additives may also be used in the polymerization, such as one or more scavengers, promoters, modifiers, chain transfer agents (such as diethyl zinc), reducing agents, oxidizing agents, hydrogen, aluminum alkyls, or silanes. Chain transfer agents include alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl, octyl or an isomer thereof), or a combination thereof, such as diethyl zinc, methylalumoxane, trimethylaluminum, triisobutylaluminum, trioctylaluminum, or a combination thereof.

Polyolefin Products

This present disclosure relates to compositions of matter produced by the methods described herein.

In at least one embodiment, a process described herein produces $C_2$ to $C_{20}$ olefin homopolymers or copolymers, such as ethylene-octene, ethylene-propylene and/or propylene-alpha-olefin (such as $C_3$ to $C_{20}$) copolymers (such as propylene-hexene copolymers or propylene-octene copolymers) having low comonomer incorporation (such as $C_6$ wt %) and/or broad molecular weight distribution (MWD).

In at least one embodiment, the process for the production of an ethylene alpha-olefin copolymer includes: polymerizing ethylene and at least one $C_3$-$C_{20}$ alpha-olefin by contacting the ethylene and the at least one $C_3$-$C_{20}$ alpha-olefin with a catalyst system as described above in at least one solution polymerization reactor at a reactor pressure of from 2 MPa to 200 MPa and a reactor temperature of from 10° C. to 250° C. to form an ethylene alpha-olefin copolymer.

In at least one embodiment, the copolymer is ethylene alpha-olefin copolymer with an Mw value of 300,000 g/mol or greater. In at least one embodiment, the copolymer is ethylene alpha-olefin copolymer with an Mw value from 150,000 g/mol to 1,500,000 g/mol, such as from 200,000 g/mol to 1,000,000 g/mol, such as from 250,000 g/mol to 500,000 g/mol, such as from 300,000 g/mol to 450,000 g/mol, such as from 350,000 g/mol to 400,000 g/mol.

In at least one embodiment, the copolymer is ethylene alpha-olefin copolymer with an Mw/Mn value of 5 or less, such as from 1 to 4, such as from 1 to 3, such as from 1 to 2.5.

In at least one embodiment, the ethylene alpha-olefin copolymer has a comonomer content of from 7 wt % to 12 wt %, such as from 7.5 wt % to 11 wt %, such as from 8 wt % to 10 wt %.

In at least one embodiment, a polymer produced herein has a unimodal or multimodal molecular weight distribution as determined by Gel Permeation Chromatography (GPC).

By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

For purposes of the claims, Mw, Mn, Mw/Mn, and modality, are determined by using a High Temperature Gel Permeation Chromatography (Tosoh Bioscience LLC), equipped with a differential refractive index detector (DRI). Three high temperature TSK gel columns (Tosoh GMHHR-H(30)HT2) are used. The nominal flow rate is 1.0 mL/min, and the nominal injection volume is 300 µL. The various transfer lines, columns, and dual flow differential refractometer (the DRI detector) are contained in an oven maintained at 160° C. Solvent for the experiment is prepared by dissolving 1.2 grams of butylated hydroxytoluene as an antioxidant in 4 liters of Aldrich reagent grade 1, 2, 4 trichlorobenzene (TCB). The TCB mixture is then filtered through a 0.1 µm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/mL, with lower concentrations being used for higher molecular weight samples. Flow rate in the apparatus is then increased to 1.0 mL/minute, and the DRI is allowed to stabilize for 2 hours before injecting the first sample. The molecular weight is determined by combining universal calibration relationship with the column calibration which is performed with a series of monodispersed polystyrene (PS) standards. The MW is calculated at each elution volume with the following equation:

$$\log M_X = \frac{\log(K_X/K_{PS})}{a_X+1} + \frac{a_{PS}+1}{a_X+1}\log M_{PS}$$

where the variables with subscript "X" stand for the test sample while those with subscript "PS" stand for PS. For polystyrene, $\alpha_{PS}$=0.67 and $K_{PS}$=0.000175.

The concentration, c, at each point in the chromatogram is calculated from the baseline-subtracted DRI signal, $I_{DRI}$, using the following equation:

$c = K_{DRI}I_{DRI}/(dn/dc)$ where $K_{DRI}$ is a constant determined by calibrating the DRI, and (dn/dc) is the refractive index increment for the system. Specifically, dn/dc=0.109 for both polyethylene and polypropylene.

The mass recovery is calculated from the ratio of the integrated area of the concentration chromatography over elution volume and the injection mass which is equal to the pre-determined concentration multiplied by injection loop volume.

In this method, $\alpha_{PS}$=0.67 and $K_{PS}$=0.000175 while a and K are for other materials as calculated and published in literature (Sun, T. et al. *Macromolecules* 2001, v. 34, pg. 6812), except that for purposes of the present invention and claims thereto, $\sigma$=0.695 and K=0.000579 for linear ethylene polymers, $\alpha$=0.705 and K=0.0002288 for linear propylene polymers, $\alpha$=0.695 and K=0.000181 for linear butene polymers, $\alpha$ is 0.695 and K is 0.000579*(1−0.0087*w2b+ 0.000018*(w2b)^2) for ethylene-butene copolymer where w2b is a bulk weight percent of butene comonomer, $\alpha$ is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for C3, C4, C6, C8, and so on co-monomers, respectively.

$$w2 = f * SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $$w2b = f * \text{bulk } CH3/1000TC$$

$$\text{bulk } SCB/1000TC = \text{bulk } CH3/1000TC - \text{bulk}\frac{CH3end}{1000TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_0$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation [η]=$\eta_S$/c, where c is concentration and is determined from the IR5 broadband channel output. The viscosity MW at each point is calculated as $M = K_{PS} M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum_i c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{K M_V^\alpha},$$

where $M_V$ is the viscosity-average molecular weight based on molecular weights determined by LS analysis and the K and a are for the reference linear polymer, which are, for purposes of the present disclosure, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mol, and intrinsic viscosity (hence K in the Mark-Houwink equation) is expressed in dL/g unless otherwise noted. Calculation of the w2b values is as discussed above.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, Vol. 34(19), pp. 6812-6820).

Differential Scanning Calorimetry (DSC). For purposes of the claims, melting Temperature, Tm, is measured by differential scanning calorimetry ("DSC") using a DSCQ200 unit. The sample is first equilibrated at 25° C. and subsequently heated to 220° C. using a heating rate of 10° C./min (first heat). The sample is held at 220° C. for 3 minutes. The sample is subsequently cooled down to −100° C. with a constant cooling rate of 10° C./min (first cool). The sample is equilibrated at −100° C. before being heated to 220° C. at a constant heating rate of 10° C./min (second heat). The exothermic peak of crystallization (first cool) is analyzed using the TA Universal Analysis software and the corresponding to 10° C./min cooling rate is determined. The endothermic peak of melting (second heat) is also analyzed using the TA Universal Analysis software and the peak melting temperature (Tm) corresponding to 10° C./min heating rate is determined.

Blends

In another embodiment, the polymer (such as the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as the polyethylene or polypropylene) is present in the above blends, at from 10 wt % to 99 wt %, based upon the weight of the polymers in the blend, such as 20 wt % to 95 wt %, such as at least 30 wt % to 90 wt %, such as at least 40 wt % to 90 wt %, such as at least 50 wt % to 90 wt %, such as at least 60 to 90 wt %, such as at least 70 wt % to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Polymers of the present disclosure, such as the foregoing polyethylenes or blends thereof, may be used in a variety of end-use applications. Such applications include, for example, mono- or multi-layer blown, extruded, and/or shrink films. These films may be formed by any suitable extrusion or coextrusion technique, such as a blown bubble film processing technique, where the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. The films can be oriented in the Machine Direction (MD) at a ratio of up to 15, such as from 5 to 7, and in the Transverse Direction (TD) at a ratio of up to 15, such as from 7 to 9. However, in another embodiment, the film is oriented to the same extent in both the MD and TD directions.

The films may vary in thickness depending on the intended application; however, films of a thickness from 1 µm to 50 µm are usually suitable. Films intended for packaging are usually from 10 µm to 50 µm thick. The thickness of the sealing layer may be from 0.2 µm to 50 µm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In at least one embodiment, one or both of the surface layers is modified by corona treatment.

This invention also relates to:

1. A catalyst compound represented by Formula (I):

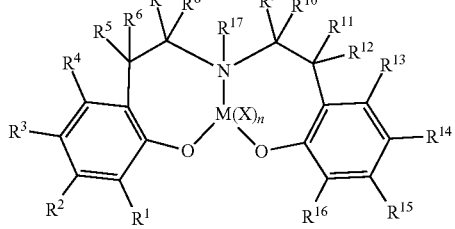

wherein:

M is a group 4 metal, preferably Hf or Zr;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, and $R^{17}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, or $R^{17}$ are joined together to form a $C_4$-$C_{62}$ cyclic or polycyclic ring structure, or a combination thereof;

each X is independently $C_1$-$C_{20}$ hydrocarbyl, $C_1$-$C_{20}$ substituted hydrocarbyl, a heteroatom or a heteroatom-containing group, or two or more Xs join together to form a $C_4$-$C_{62}$ cyclic or polycyclic ring structure, preferably X is methyl, benzyl, or chloro; and n is 2 or 3.

2. The catalyst compound of paragraph 1, wherein $R^{17}$ is hydrogen or $C_1$-$C_{40}$ hydrocarbyl.

3. The catalyst compound of paragraph 1 or 2, wherein n is 2.

4. The catalyst compound of paragraph 1, 2, or 3, wherein $R^1$ is represented by the structure:

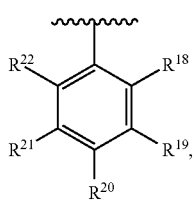

wherein each of $R^{18}$, $R^{19}$, $R^{20}$, $R^{21}$, and $R^{22}$ is independently selected from hydrogen, $C_1$-$C_{40}$ hydrocarbyl, $C_1$-$C_{40}$ substituted hydrocarbyl, a heteroatom or a heteroatom-containing group, or two or more of $R^{s1}$, $R^{19}$, $R^{20}$, $R^{21}$, and $R^{22}$ are joined together to form a $C_4$-$C_{62}$ cyclic or polycyclic ring structure, or a combination thereof.

5. The catalyst compound of any of paragraphs 1 to 4, wherein each of $R^5$, $R^6$, $R^7$, $R^8$, $R^9$, $R^{10}$, $R^{11}$, and $R^{12}$ is independently hydrogen and $C_1$-$C_{10}$ hydrocarbyl.

6. The catalyst compound of paragraph 5, wherein two or more of $R^5$, $R^6$, $R^7$, and $R^8$ are hydrogen and two or more of $R^9$, $R^{10}$, $R^{11}$, and $R^{12}$ are hydrogen.

7. The catalyst compound of paragraph 6, wherein each of $R^5$, $R^6$, $R^7$, $R^8$, $R^9$, $R^{10}$, $R^{11}$, and $R^{12}$ is hydrogen.

8. The catalyst compound of paragraph 1, wherein the catalyst compound is one or more of:

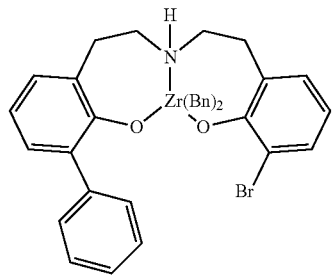

1

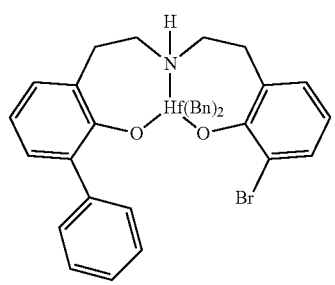

2

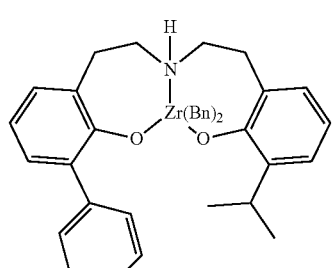

3

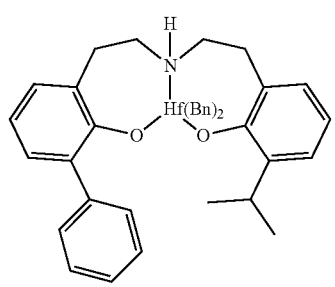

4

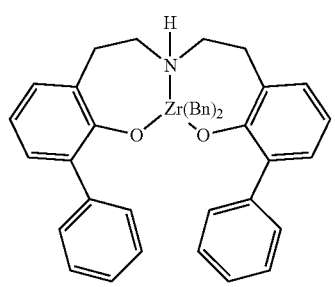

5

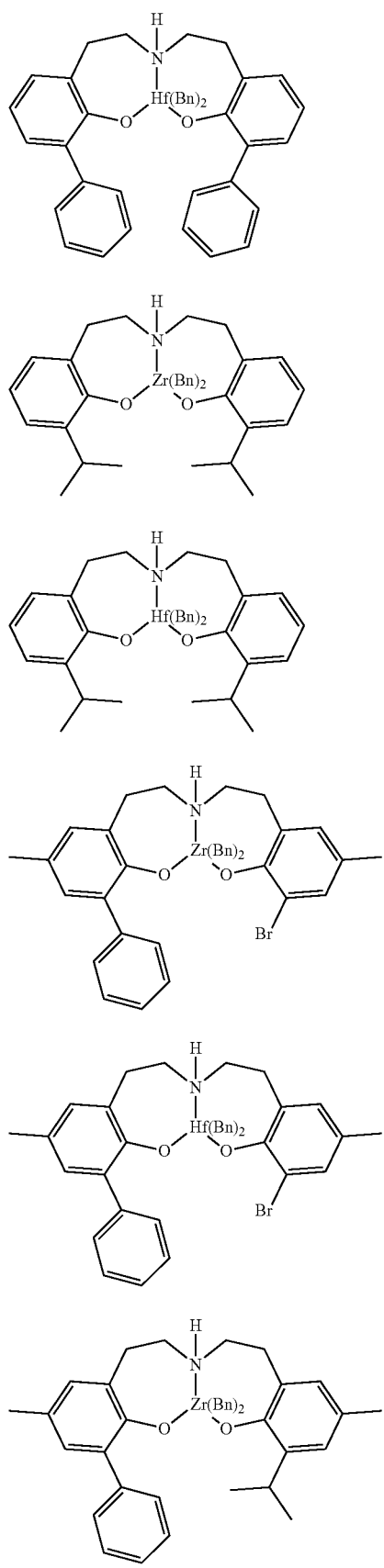
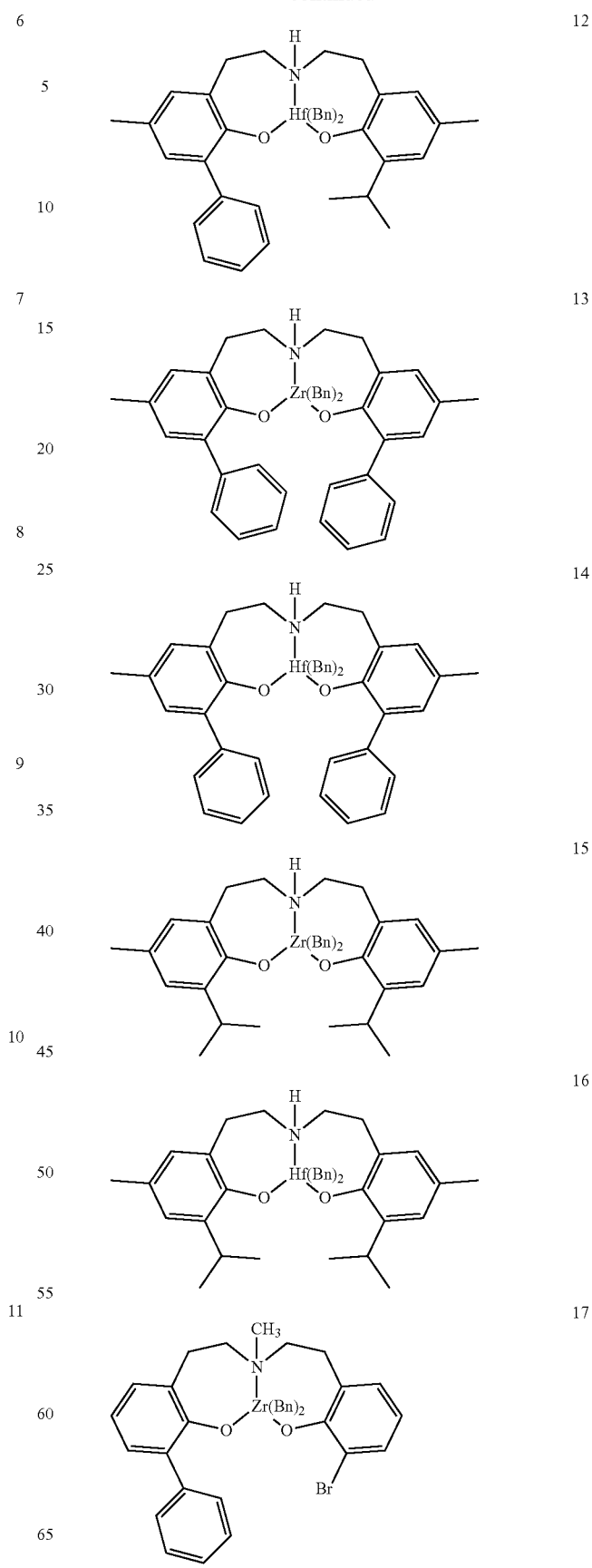

18
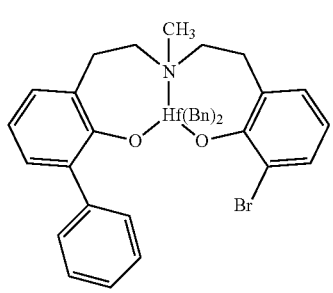
19
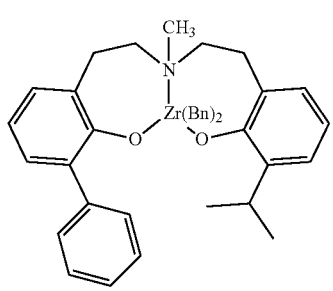
20
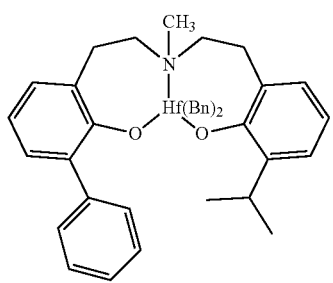
21
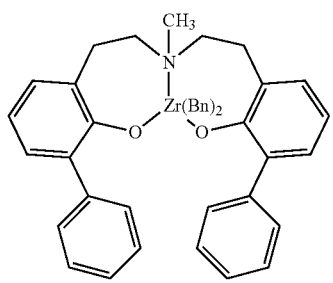
22
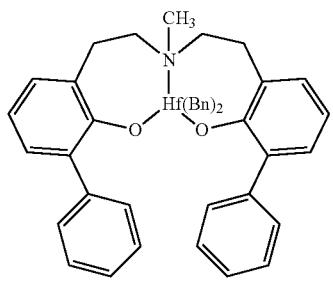
23
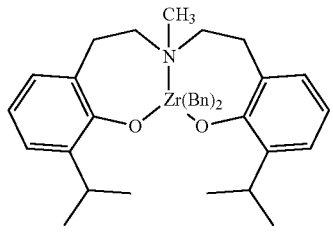
24
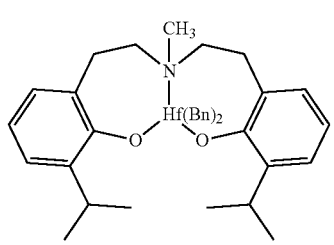
25
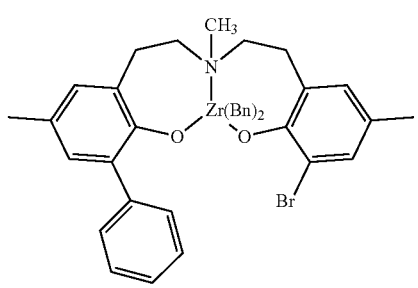
26
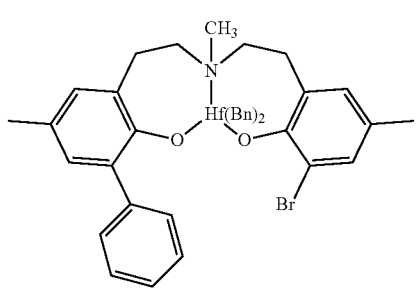
27
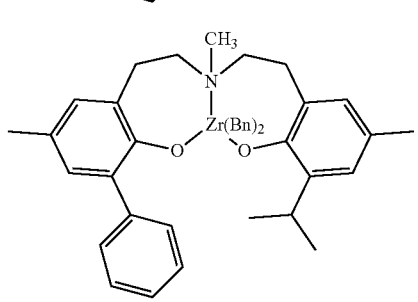
28
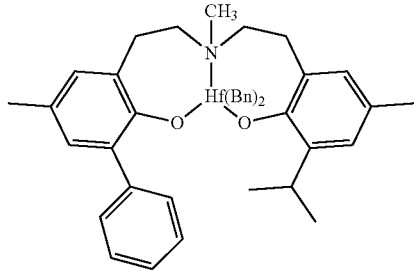
29
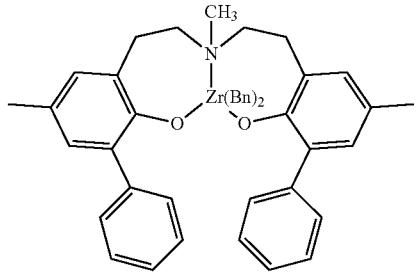

30 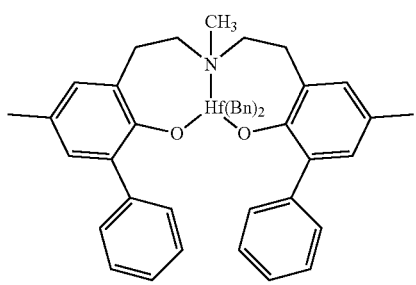

31 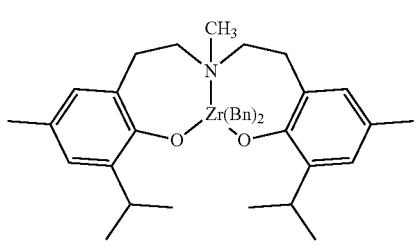

32 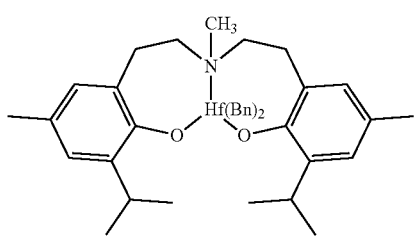

33 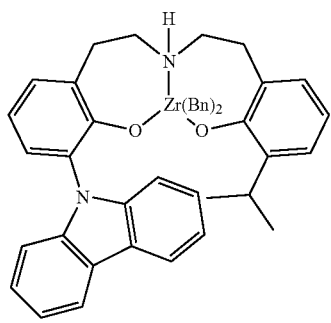

34 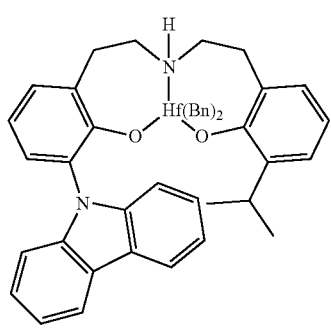

35 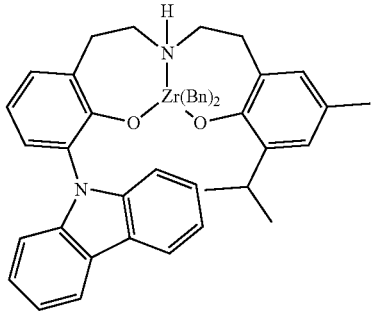

36 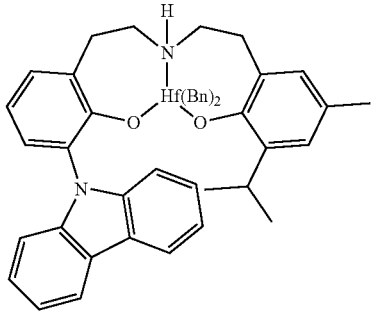

9. A catalyst system comprising an activator and the catalyst compound of any of paragraphs 1-8.

10. The catalyst system of paragraph 16, further comprising a support material, preferably selected from $Al_2O_3$, $ZrO_2$, $SiO_2$, $SiO_2/Al_2O_3$, $SiO_2/TiO_2$, silica clay, silicon oxide/clay, or mixtures thereof.

11. The catalyst system of paragraph 9 or 10, wherein the activator comprises an alkylalumoxane.

12. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of any of paragraphs 9 to 11 in the solution phase at a pressure of from 2 MPa to 200 MPa and a temperature of from 10° C. to 250° C. to form an ethylene alpha-olefin copolymer.

13. The process of paragraph 12, wherein the ethylene alpha-olefin copolymer has an Mw value of 300,000 g/mol or greater and/or an Mw/Mn value of 5 or less.

14. The process of paragraph 12 or 13, wherein the ethylene alpha-olefin copolymer has a comonomer content of from 7 wt % to 12 wt %, preferably from 8 wt % to 10 wt %.

EXPERIMENTAL

All anhydrous solvents were purchased from Fisher Chemical and were degassed and dried over molecular sieves prior to use. Deutrated solvents were purchased from Cambridge Isotope Laboratories and dried over molecular sieves prior to use. n-Butyl lithium (2.5 M solution in hexane) and tetramethyldichlorodisilane ($Me_4Si_2Cl_2$) were purchased from Sigma-Aldrich. Hafnium tetrachloride ($HfCl_4$) 99+% and trimethylsilylmethyltrifluoromethanesulfonate were purchased from Strem Chemicals and TCI America, respectively, and used as received. Potassium cyclopentadienide (KCp) was prepared according to the procedure described in *J. Organomet. Chem.* 1975, 84, $C_1$-$C_4$. MAO was obtained as a 30 wt % MAO in toluene solution from Albemarle (e.g., 13.6 wt % Al or 5.04 mmol/g).

EXAMPLES

Synthesis of the Catalysts:

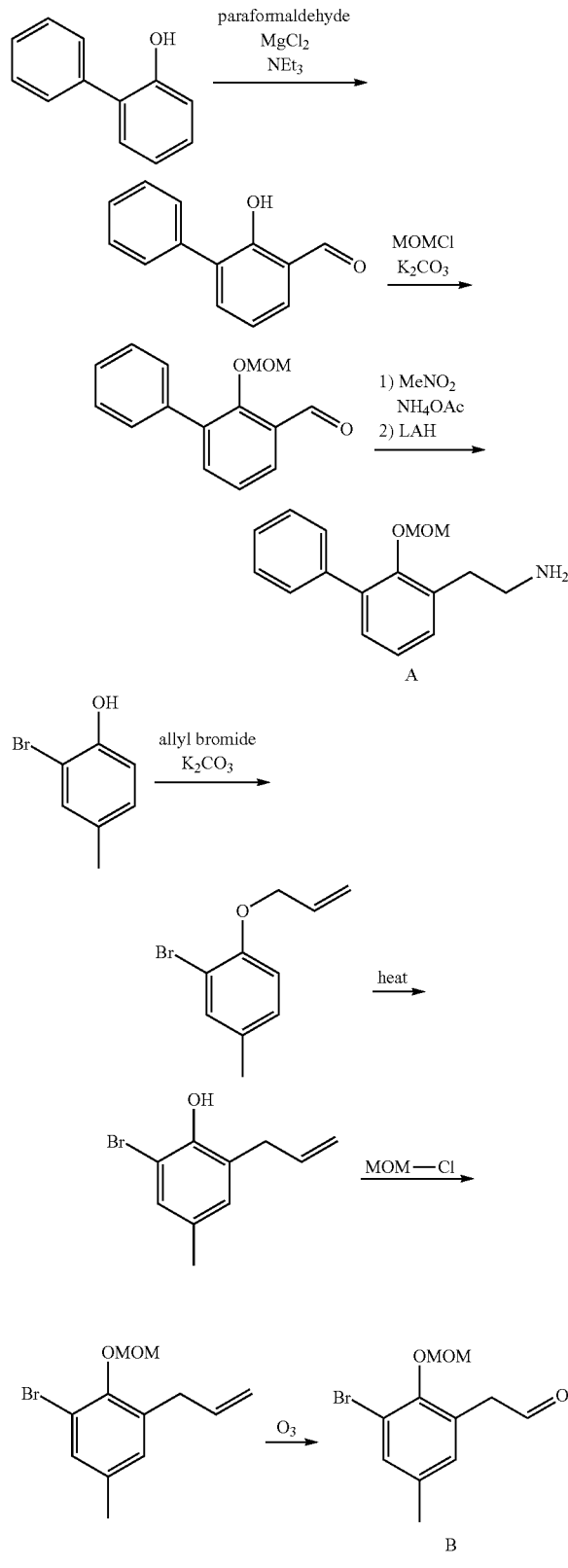

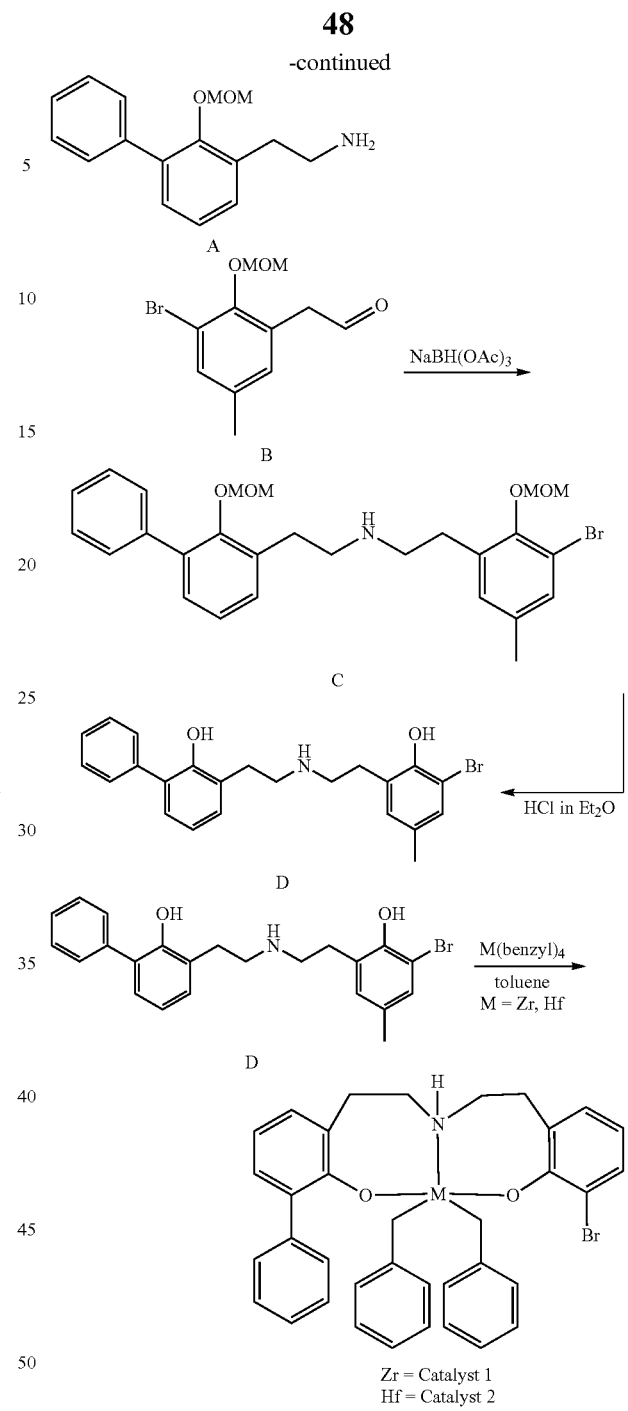

General Considerations:

All reagents were purchased from commercial vendors (Aldrich) and used as received unless otherwise noted. Solvents were sparged with $N_2$ and dried over 3 Å molecular sieves. Tetrabenzyl hafnium and tetrabenzyl zirconium were purchased from Strem Chemicals. All chemical manipulations were performed in a nitrogen environment unless otherwise stated. Flash column chromatography was carried out with Sigma Aldrich Silica gel 60 Å (70-230 Mesh) using solvent systems specified.

2-hydroxy-[1,1'-biphenyl]-3-carbaldehyde

2-Phenylphenol (7.5 g, 44 mmol), magnesium chloride (8.4 g, 88 mmol), and triethylamine (22 mL, 297 mmol)

were dissolved in acetonitrile and stirred at ambient temperature for 15 minutes. Paraformaldehyde (8.9 g, 297 mmol) was added and the reaction heated at reflux for 3 hours, upon which, the solution turned bright yellow. The reaction was quenched with water and extracted several times with ethyl acetate. The combined organic layers were washed with brine, dried (MgSO$_4$), filtered and concentrated under a stream of N$_2$. Column chromatography with 10% acetone/isohexane gave the aldehyde in approximately 50% yield.

2-(methoxymethoxy)-[1,1'-biphenyl]-3-carbaldehyde

The above aldehyde (4.0 g, 20.1 mmol) was dissolved in DMF in a 100 mL flask. Potassium carbonate (6.9 g, 50 mmol) was added and the mixture stirred for 30 minutes. The solution was cooled to 0° C. and MOMCl (2.29 mL, 30 mmol) was added. It was stirred for 15 minutes at 0° C., then at ambient until completion. The reaction was quenched with water and extracted with 3×Et$_2$O. The organic fractions were combined, rinsed with water and brine, dried with MgSO$_4$, filtered and concentrated. Purification by silica gel column chromatography (2% to 10% ethyl acetate/isohexane) gave the product in 78% yield.

2-(2-(methoxymethoxy)-[1,1'-biphenyl]-3-yl)ethan-1-amine (A)

2-(methoxymethoxy)-[1,1'-biphenyl]-3-carbaldehyde (10.0 g, 41 mmol) and ammonium acetate (2.70 g, 35 mmol) were combined in 200 mL of nitromethane and heated at 110° C. for 2 hours. The nitromethane was removed in vacuo to yield an orange solid. The solid was dissolved in THF and filtered to remove residual ammonium acetate. The filtrate was added slowly at 0° C. to a flask containing a heterogenous solution of lithium aluminum hydride (6.27 g, 165 mmol) in 200 mL THF. The reaction was heated at 70° C. for 2 hours. After cooling to 0° C., the reaction was quenched by addition of water (1.3 g water/g LAH), 1 N NaOH (1.3 g solution/g LAH), then water (1.3 g solution/g LAH). The solution stirred for 10 minutes and a granular white solid precipitated. The solid was removed via filtration and rinsed with Et$_2$O. The filtrate was rinsed with a saturated solution of sodium bicarbonate and brine, dried with MgSO$_4$ and concentrated to yield the desired product as an orange oil in 45% yield based on 60% purity.

N-(3-bromo-2-(methoxymethoxy)-5-methylphenethyl)-2-(2-(methoxymethoxy)-[1,1'-biphenyl]-3-yl)ethan-1-amine (C)

Amine A (0.50 g, 1.9 mmol) and aldehyde B (0.53 g, 1.9 mmol) were combined in 50 mL of dichloromethane. After the slow addition of sodium triacetoxyborohydride (0.41 g, 1.9 mmol), the solution was stirred at room temperature for 16 hours. The reaction was quenched with a saturated solution of ammonium chloride and extracted with three portions of dichloromethane. Combined organic fractions were washed with brine, then dried with MgSO$_4$, filtered, and concentrated to yield the desired product as an orange oil in quantitative yield.

3-(2-((3-bromo-2-hydroxy-5-methylphenethyl)amino)ethyl)-[1,1'-biphenyl]-2-ol (D)

Compound C (1.0 g, 1.9 mmol) was dissolved in 100 mL of 1:1 dichloromethane/methanol. 1 mL of concentrated HCl (10 eq.) was added and the reaction stirred at room temperature for 16 hours. A saturated solution of sodium bicarbonate was added to bring the solution to pH 6, and the mixture was concentrated slightly. The solution was extracted with three portions of ethyl acetate. Combined organic fractions were washed with water and brine, then dried with MgSO$_4$, filtered, and concentrated to yield the product as an orange oil in 80% yield.

Metallation:

In a nitrogen atmosphere, the ligand D was dissolved in 4 mL of toluene in a 20 mL vial. Tetrabenzyl zirconium or hafnium was dissolved in 4 mL of toluene in a separate vial. The solutions were combined and after 1 hour, filtered through Celite. The filtrate volume was reduced and solids precipitated upon addition of pentane to the rapidly stirred solution. The solids were collected and dried under vacuum.

General Polymerization Procedures for Parallel Pressure Reactor.

Solvents, polymerization-grade toluene, and isohexane were supplied by ExxonMobil Chemical Company and purified by passing through a series of columns: two 500 cc Oxyclear cylinders in series from Labclear (Oakland, Calif.), followed by two 500 cc columns in series packed with dried 3 Å mole sieves (8-12 mesh; Aldrich Chemical Company), and two 500 cc columns in series packed with dried 5 Å mole sieves (8-12 mesh; Aldrich Chemical Company). 1-octene (C$_8$) and 1-hexene (C$_6$) (98%, Aldrich Chemical Company) were dried by stirring over NaK overnight followed by filtration through basic alumina (Aldrich Chemical Company, Brockman Basic 1).

Polymerization-grade ethylene (C$_2$) was used and further purified by passing the gas through a series of columns: 500 cc Oxyclear cylinder from Labclear (Oakland, Calif.) followed by a 500 cc column packed with dried 3 Å mole sieves (8-12 mesh; Aldrich Chemical Company) and a 500 cc column packed with dried 5 Å mole sieves (8-12 mesh; Aldrich Chemical Company).

Solutions of the metal complexes and activators were prepared in a drybox using toluene (ExxonMobil Chemical Company; anhydrous, stored under nitrogen; 98%). Concentrations are typically 0.2 mmol/L for the metal complexes, 0.2 mmol/L for N,N-dimethyl anilinium tetrakis-pentafluorophenyl borate (Activator-1), and 0.5% w/w for methyl alumoxane (MAO).

Polymerizations were carried out in a parallel, pressure reactor, as generally described in U.S. Pat. Nos. 6,306,658; 6,455,316; 6,489,168; WO 00/09255; and Murphy et al., J. Am. Chem. Soc., 2003, v. 125, pp. 4306-4317, each of which is fully incorporated herein by reference. The experiments were conducted in an inert atmosphere (N$_2$) drybox using autoclaves equipped with an external heater for temperature control, glass inserts (internal volume of reactor=23.5 mL for C2 and C2/C8; 22.5 mL for C3 runs), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours.

Catalyst systems dissolved in solution were used in the polymerization examples below, unless specified otherwise.

Ethylene-Octene Copolymerization (EO).

A pre-weighed glass vial insert and disposable stirring paddle were fitted to each reaction vessel of the reactor, which contains 48 individual reaction vessels. The reactor was then closed and purged with ethylene. Each vessel was charged with enough solvent (isohexane) to bring the total reaction volume, including the subsequent additions, to the desired volume, typically 5 mL. 1-octene was injected into the reaction vessel and the reactor was heated to the set temperature of 80° C. and pressurized to 95 psig, while stirring at 800 rpm.

The catalyst solution (0.080 umol of metal complex) was injected into the reaction vessel and the polymerization was allowed for 30 minutes. Ethylene was added continuously (through the use of computer controlled solenoid valves) to the autoclaves during polymerization to maintain reactor gauge pressure (P setpt, +/−2 psig) and the reactor temperature (T) was monitored and typically maintained within +/−1° C. The reaction was quenched by pressurizing the vessel with compressed air. After the reactor was vented and cooled, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight, by FT-IR (see below) to determine percent octene incorporation, and by DSC (see below) to determine melting point ($T_m$).

For polymerizations using MAO as activator (typically 100 to 1,000 molar equivalents), the MAO solution was injected into the reaction vessel after the addition of 1-octene and prior to heating the vessel to the set temperature and pressurizing with ethylene. No additional aluminum reagent was used as scavenger during these runs.

Equivalence is determined based on the mole equivalents relative to the moles of the transition metal in the catalyst complex.

Polymer Characterization.

Polymer sample solutions were prepared by dissolving polymer in 1,2,4-trichlorobenzene (TCB, 99+% purity from Sigma-Aldrich) containing 2,6-di-tert-butyl-4-methylphenol (BHT, 99% from Aldrich) at 165° C. in a shaker oven for approximately 3 hours. The typical concentration of polymer in solution was from 0.1 to 0.9 mg/mL with a BHT concentration of 1.25 mg BHT/mL of TCB.

To determine various molecular weight related values by GPC, high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30 cm×7.5 mm linear columns, each containing PLgel 10 µm, Mix B. The GPC system was calibrated using polystyrene standards ranging from 580 to 3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.28 mg/mL and 400 uL of a polymer solution was injected into the system. The concentration of the polymer in the eluent was monitored using an evaporative light scattering detector. The molecular weights presented are relative to linear polystyrene standards and are uncorrected, unless indicated otherwise.

Differential Scanning Calorimetry (DSC) measurements were performed on a TA-Q100 instrument to determine the melting point ($T_m$) of the polymers. Samples were pre-annealed at 220° C. for 15 minutes and then allowed to cool to room temperature overnight. The samples were then heated to 220° C. at a rate of 100° C./min and then cooled at a rate of 50° C./min. Melting points were collected during the heating period.

The weight percent of ethylene incorporated in polymers was determined by rapid FT-IR spectroscopy on a Bruker Equinox 55+IR in reflection mode. Samples were prepared in a thin film format by evaporative deposition techniques. FT-IR methods were calibrated using a set of samples with a range of known wt % ethylene content. For ethylene-1-octene copolymers, the wt % octene in the copolymer was determined via measurement of the methyl deformation band at ~1375 $cm^{-1}$. The peak height of this band was normalized by the combination and overtone band at ~4321 $cm^{-1}$, which corrects for path length differences.

All molecular weights are reported in g/mol unless otherwise noted.

The results obtained for the ethylene-octene polymerization using catalysts activated with MAO (0.5 wt % in toluene) are reported in Table 1. Catalyst 1 is represented by the formula:

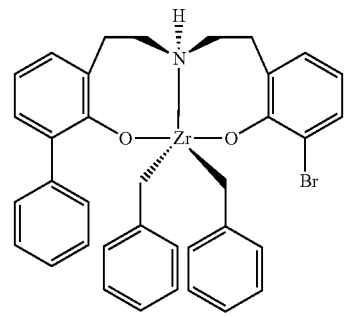

As shown in Table 1, Catalyst 1 was found to be an active catalyst for olefin polymerization upon activation with MAO. High molecular weight polymers formed at 80° C. and under 95 psig in the presence of MAO and 1-octene were obtained in good yield with an Mw value of 350 Kg/mol or greater, an Mn value of 190 Kg/mol or greater, and an Mw/Mn of about 2. Furthermore, Catalyst 1 demonstrated a high 1-octene incorporation with comonomer content of at least 8.5 wt % or greater.

TABLE 1

| Ethylene-Octene polymerization data | |
|---|---|
| catalyst | 0.08 umol Catalyst 1 |
| activator | 500 eq MAO |
| 1-octene | 100 uL |
| volume of solution | 5 mL |
| solvent | isohexane |
| temperature | 80° C. |
| pressure setpoint | 95 psig (655 kPa) |

| | Example 1a | Example 1b |
|---|---|---|
| reaction time, s | 1802 | 1801 |
| yield, g | 0.011 | 0.010 |
| activity, g/mmol/h | 275 | 250 |
| $M_w$, g/mol | 357,000 | 413,000 |
| $M_n$, g/mol | 191,000 | 195,000 |
| Mw/Mn | 1.9 | 2.1 |
| wt % octene | 8.7 | 9.7 |
| polymer Tm, ° C. | 124.3 | 124.1 |
| $\Delta H_f$, J/g | 51.4 | 75.6 |

Overall, catalysts, catalyst systems, and processes of the present disclosure can provide polyolefins at high activity values (e.g., 250 gP/gCat/hour or greater), high Mw (e.g., 350,000 g/mol), Mn values of 190,000 g/mol or greater, narrow Mw/Mn (e.g., about 2). Catalysts, catalyst systems, and processes of the present disclosure can provide polymers having a high comonomer content (e.g., 8.5 wt % or greater).

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A catalyst compound represented by Formula (I):

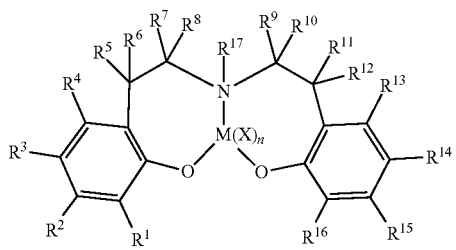

wherein:

M is a group 4 metal;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, and $R^{17}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, or $R^{17}$ are joined together to form a $C_4$-$C_{62}$ cyclic or polycyclic ring structure, or a combination thereof;

each X is independently $C_1$-$C_{20}$ hydrocarbyl, $C_1$-$C_{20}$ substituted hydrocarbyl, a heteroatom or a heteroatom-containing group, or two or more Xs join together to form a $C_4$-$C_{62}$ cyclic or polycyclic ring structure; and n is 2 or 3.

2. The catalyst compound of claim 1, wherein $R^{17}$ is hydrogen or $C_1$-$C_{40}$ hydrocarbyl.

3. The catalyst compound of claim 2, wherein $R^{17}$ $C_1$-$C_{40}$ hydrocarbyl.

4. The catalyst compound of claim 2, wherein $R^{17}$ is hydrogen.

5. The catalyst compound of claim 1, wherein n is 2.

6. The catalyst compound of claim 1, wherein $R^1$ is represented by the structure:

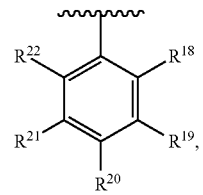

wherein each of $R^{18}$, $R^{19}$, $R^{20}$, $R^{21}$, and $R^{22}$ is independently selected from hydrogen, $C_1$-$C_{40}$ hydrocarbyl, $C_1$-$C_{40}$ substituted hydrocarbyl, a heteroatom or a heteroatom-containing group, two or more of $R^{18}$, $R^{19}$, $R^{20}$, $R^{21}$, and $R^{22}$ are joined together to form a $C_4$-$C_{62}$ cyclic or polycyclic ring structure, or a combination thereof.

7. The catalyst compound of claim 6, wherein each of $R^{18}$, $R^{19}$, $R^{20}$, $R^{21}$, and $R^{22}$ is independently selected from hydrogen and $C_1$-$C_{40}$ hydrocarbyl.

8. The catalyst compound of claim 7, wherein each of $R^{18}$, $R^{19}$, $R^{20}$, $R^{21}$, and $R^{22}$ is hydrogen.

9. The catalyst compound of claim 1, wherein each of $R^5$, $R^6$, $R^7$, $R^8$, $R^9$, $R^{10}$, $R^{11}$, and $R^{12}$ is independently selected from hydrogen and $C_1$-$C_{10}$ hydrocarbyl.

10. The catalyst compound of claim 9, wherein two or more of $R^5$, $R^6$, $R^7$, and $R^8$ are hydrogen and two or more of $R^9$, $R^{10}$, $R^{11}$, and $R^{12}$ are hydrogen.

11. The catalyst compound of claim 10, wherein each of $R^5$, $R^6$, $R^7$, $R^8$, $R^9$, $R^{10}$, $R^{11}$, and $R^{12}$ is hydrogen.

12. The catalyst compound of claim 1, wherein M is Zr or Hf.

13. The catalyst compound of claim 1, wherein each X is methyl, benzyl, or chloro.

14. The catalyst compound of claim 1, wherein the catalyst compound is one or more of:

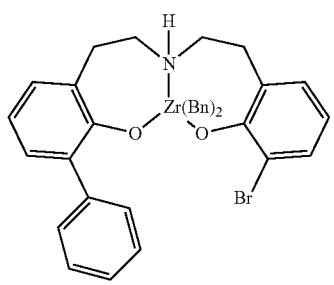
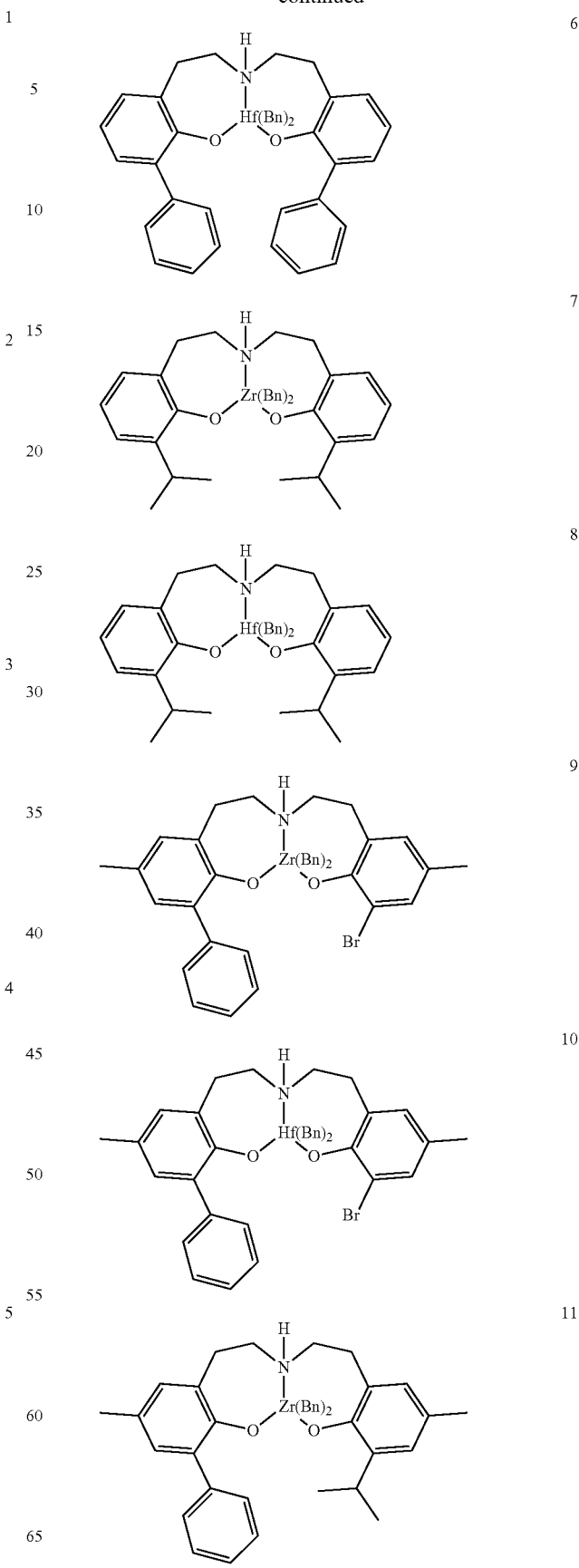

12
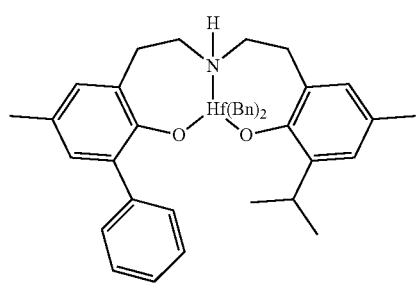
13
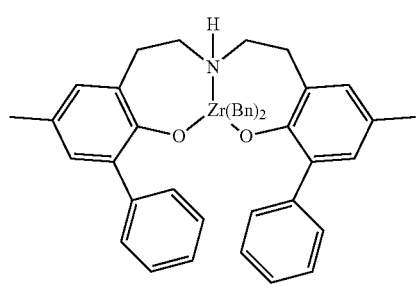
14
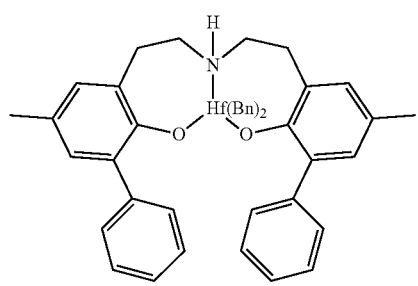
15
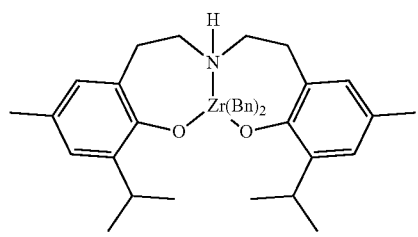
16
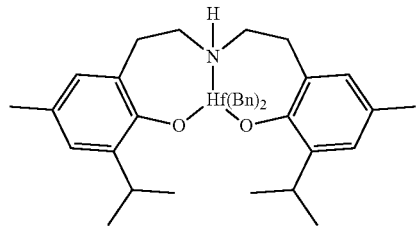
17
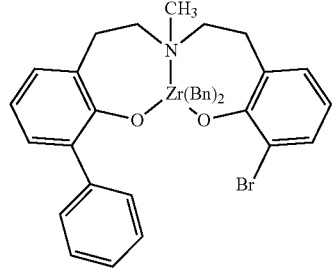
18
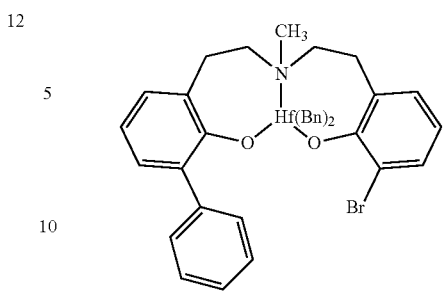
19
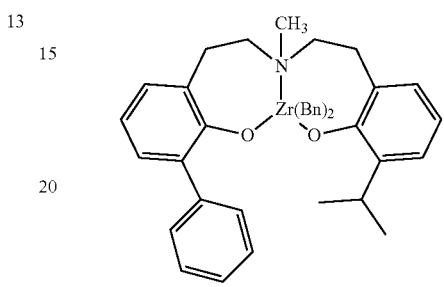
20
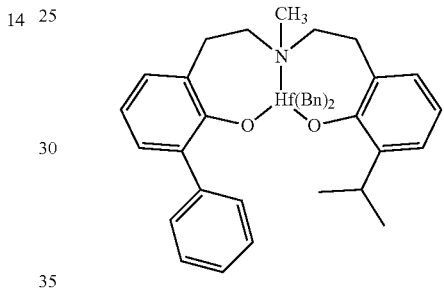
21
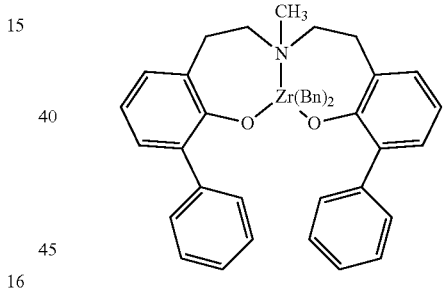
22
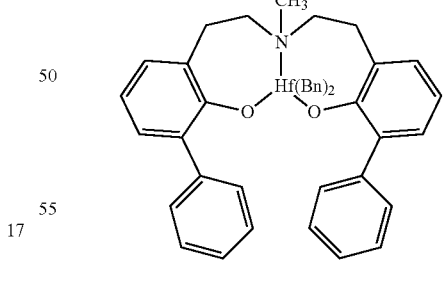
23
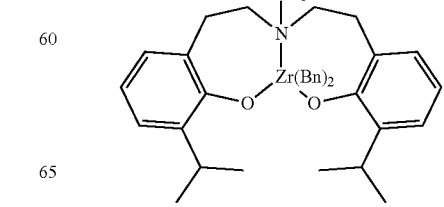

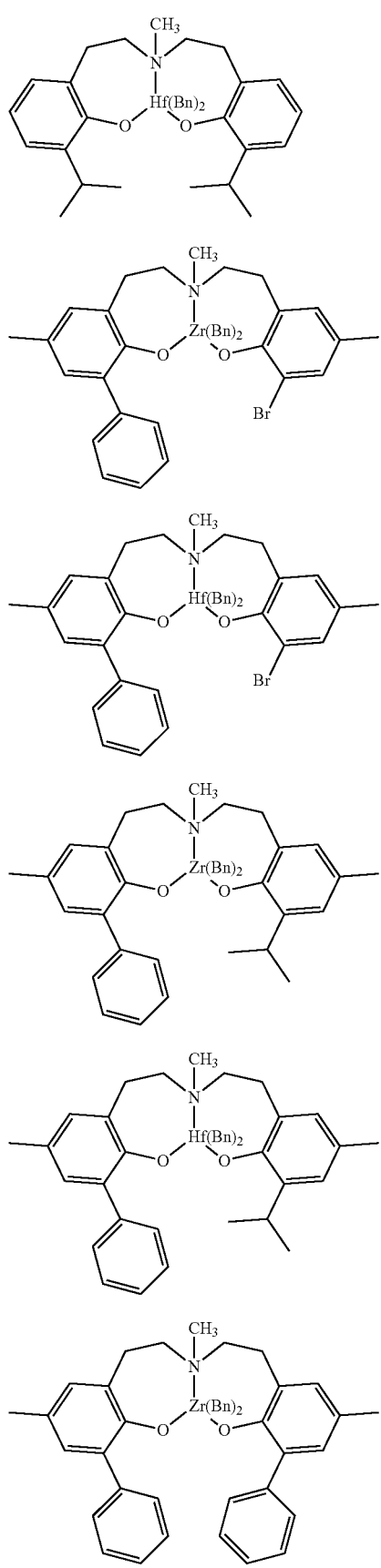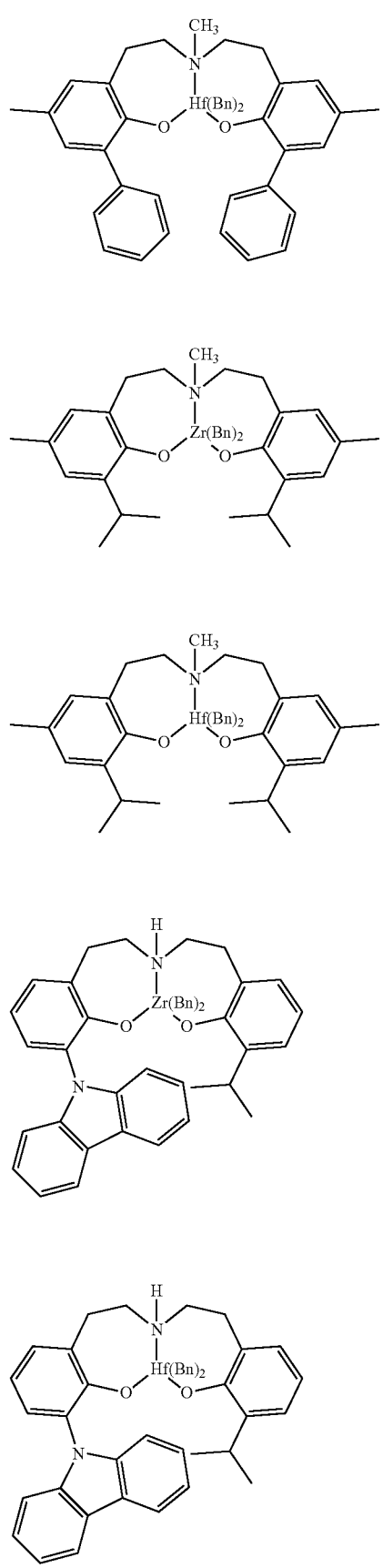

-continued

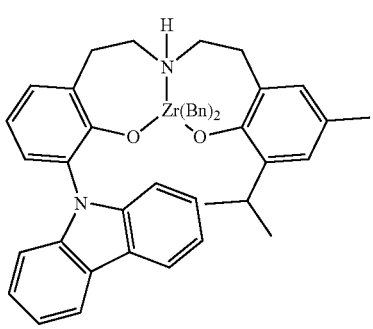

35

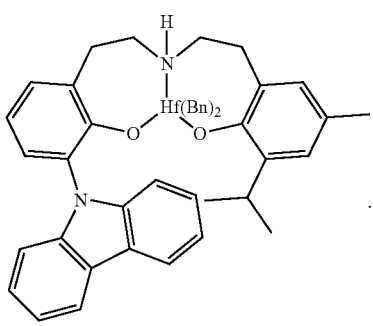

36

15. The catalyst compound of claim 14, wherein the catalyst compound is one or more of:

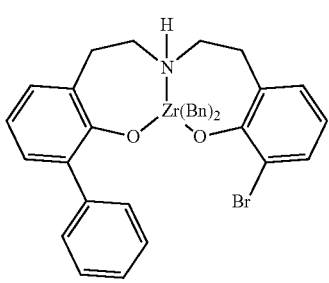

1

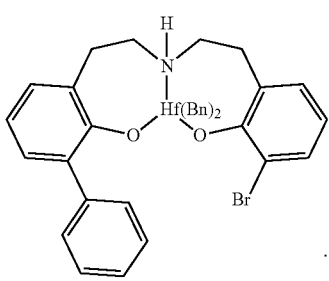

2

16. A catalyst system comprising an activator and the catalyst compound of claim 1.

17. The catalyst system of claim 16, further comprising a support material.

18. The catalyst system of claim 17, wherein the support material is selected from $Al_2O_3$, $ZrO_2$, $SiO_2$, $SiO_2/Al_2O_3$, $SiO_2/TiO_2$, silica clay, silicon oxide/clay, and mixtures thereof.

19. The catalyst system of claim 16, wherein the activator comprises an alkylalumoxane.

20. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of claim 16 in a solution phase at a reactor pressure of from 2 MPa to 200 MPa and a reactor temperature of from 10° C. to 250° C. to form the ethylene alpha-olefin copolymer.

21. The process of claim 20, wherein the ethylene alpha-olefin copolymer has an Mw value of 300,000 g/mol or greater.

22. The process of claim 21, wherein the ethylene alpha-olefin copolymer has an Mw value of from 350,000 g/mol to 450,000 g/mol.

23. The process of claim 20, wherein the ethylene alpha-olefin copolymer has an Mw/Mn value of 5 or less.

24. The process of claim 23, wherein the ethylene alpha-olefin copolymer has an Mw/Mn value of from 1 to 2.5.

25. The process of claim 20, wherein the ethylene alpha-olefin copolymer has a comonomer content of from 7 wt % to 12 wt %.

26. The process of claim 25, wherein the comonomer content of the ethylene alpha-olefin copolymer is from 8 wt % to 10 wt %.

27. A catalyst system comprising an activator, the catalyst compound of claim 14, and optional support material.

28. A catalyst system comprising an activator, the catalyst compound of claim 1, and optional support material, wherein $R^{17}$ is hydrogen or $C_1$-$C_{40}$ hydrocarbyl;

n is 2;

$R^1$ is represented by the structure:

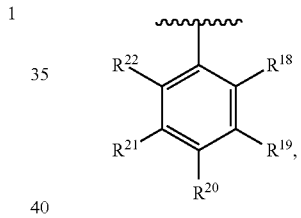

wherein each of $R^{18}$, $R^{19}$, $R^{20}$, $R^{21}$, and $R^{22}$ is independently selected from hydrogen, $C_1$-$C_{40}$ hydrocarbyl, $C_1$-$C_{40}$ substituted hydrocarbyl, a heteroatom or a heteroatom-containing group, or two or more of $R^{18}$, $R^{19}$, $R^{20}$, $R^{21}$, and $R^{22}$ are joined together to form a $C_4$-$C_{62}$ cyclic or polycyclic ring structure, or a combination thereof;

each of $R^{18}$, $R^{19}$, $R^{20}$, $R^{21}$, and $R^{22}$ is independently selected from hydrogen and $C_1$-$C_{40}$ hydrocarbyl; and M is Zr or Hf.

29. The catalyst system of claim 28, wherein each of $R^5$, $R^6$, $R^7$, $R^8$, $R^9$, $R^{10}$, $R^{11}$, and $R^{12}$ is independently selected from hydrogen and $C_1$-$C_{10}$ hydrocarbyl.

30. The catalyst system of claim 29, wherein two or more of $R^5$, $R^6$, $R^7$, and $R^8$ are hydrogen and two or more of $R^9$, $R^{10}$, $R^{11}$, and $R^{12}$ are hydrogen.

31. The catalyst system of claim 28, wherein each of $R^5$, $R^6$, $R^7$, $R^8$, $R^9$, $R^{10}$, $R^{11}$, and $R^{12}$ is hydrogen.

32. The catalyst system of claim 28, wherein each X is methyl, benzyl, or chloro.

33. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of claim 27 in a solution phase at a reactor pressure of from 2 MPa to 200 MPa and a reactor temperature of from 10° C. to 250° C. to form the ethylene alpha-olefin copolymer.

34. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of claim 28 in a solution phase at a reactor pressure of from 2 MPa to 200 MPa and a reactor temperature of from 10° C. to 250° C. to form the ethylene alpha-olefin copolymer.

\* \* \* \* \*